United States Patent
Koslu

(10) Patent No.: US 12,443,898 B2
(45) Date of Patent: *Oct. 14, 2025

(54) METHODS, APPARATUSES, AND COMPUTER PROGRAM PRODUCTS FOR PROVISION OF AUTOMATED INTERACTIVE ELECTRONIC SEATING CHARTS

(71) Applicant: Dogan Koslu, El Segundo, CA (US)

(72) Inventor: Dogan Koslu, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,127

(22) Filed: Jun. 4, 2024

(65) Prior Publication Data
US 2024/0320568 A1 Sep. 26, 2024

Related U.S. Application Data

(63) Continuation of application No. 17/478,675, filed on Sep. 17, 2021, now Pat. No. 12,014,295.
(Continued)

(51) Int. Cl.
*G06Q 10/02* (2012.01)
*G06T 15/08* (2011.01)
(Continued)

(52) U.S. Cl.
CPC ............. *G06Q 10/02* (2013.01); *G06T 15/08* (2013.01); *G06T 15/205* (2013.01); *G06T 17/10* (2013.01); *G06T 2215/16* (2013.01)

(58) Field of Classification Search
CPC ....... G06Q 10/02; G06T 15/08; G06T 15/205; G06T 17/10; G06T 2215/16
(Continued)

(56) References Cited

U.S. PATENT DOCUMENTS

| | | | |
|---|---|---|---|
| 2012/0166960 A1 | 6/2012 | Salles | |
| 2013/0268899 A1* | 10/2013 | Valentino | G06Q 10/02 715/852 |
| 2021/0357820 A1* | 11/2021 | Weir | G08B 5/221 |

FOREIGN PATENT DOCUMENTS

WO    WO 2001/86594 A1    11/2001

OTHER PUBLICATIONS

"Web-based 3-D Theatre Seating Charts and Ticket Reservation Application" Published by Rochester Institute of Technology (Year: 2006).*

(Continued)

*Primary Examiner* — Zeina Elchanti
(74) *Attorney, Agent, or Firm* — Alston & Bird LLP

(57) ABSTRACT

Provided are apparatuses, systems, methods, and computer program products for generating and transforming an electronic seating chart. The electronic seating chart comprises physical units of a physical space. In some embodiments, a digital image associated with a physical space is received from a first computing device. The digital image includes information associated with a physical space. Physical features may be extracted from the digital image and utilized to generate an electronic seating chart. The electronic seating chart may include three-dimensional renderings of the physical space and physical units therein. An automatically generated electronic seating chart may capture a plurality of seats and other features provided by the digital image. In some embodiments, an interactive tool set may be provided that is configured for the generation, deletion, and transformation of an electronic seating chart and physical units therein. The interactive tool set may provide for collaboration between a plurality of users.

20 Claims, 24 Drawing Sheets

Related U.S. Application Data

(60) Provisional application No. 63/079,874, filed on Sep. 17, 2020.

(51) Int. Cl.
*G06T 15/20* (2011.01)
*G06T 17/10* (2006.01)

(58) Field of Classification Search
USPC .......................................................... 705/5
See application file for complete search history.

(56) References Cited

OTHER PUBLICATIONS

International Search Report and Written Opinion for PCT/US2021/050918 (ISA/EP) mailed Dec. 23, 2021 (13 pages).
Vivenu, Ticketing Supercharged, The Wayback Maching: <https://web.archive/org/web/202108212018447/tttps://vivenu.cm/> Aug. 2021 (9 pages).

\* cited by examiner

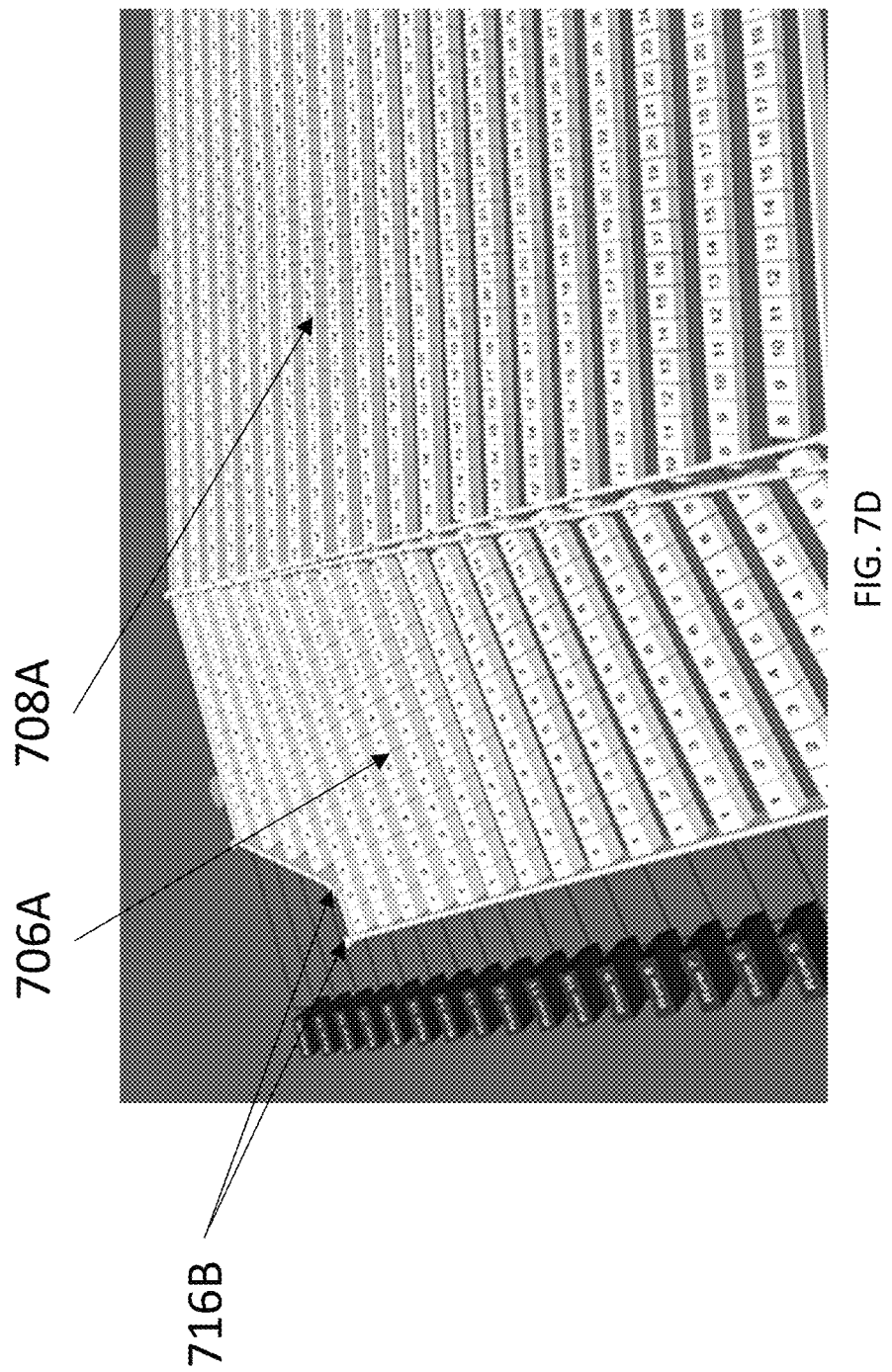

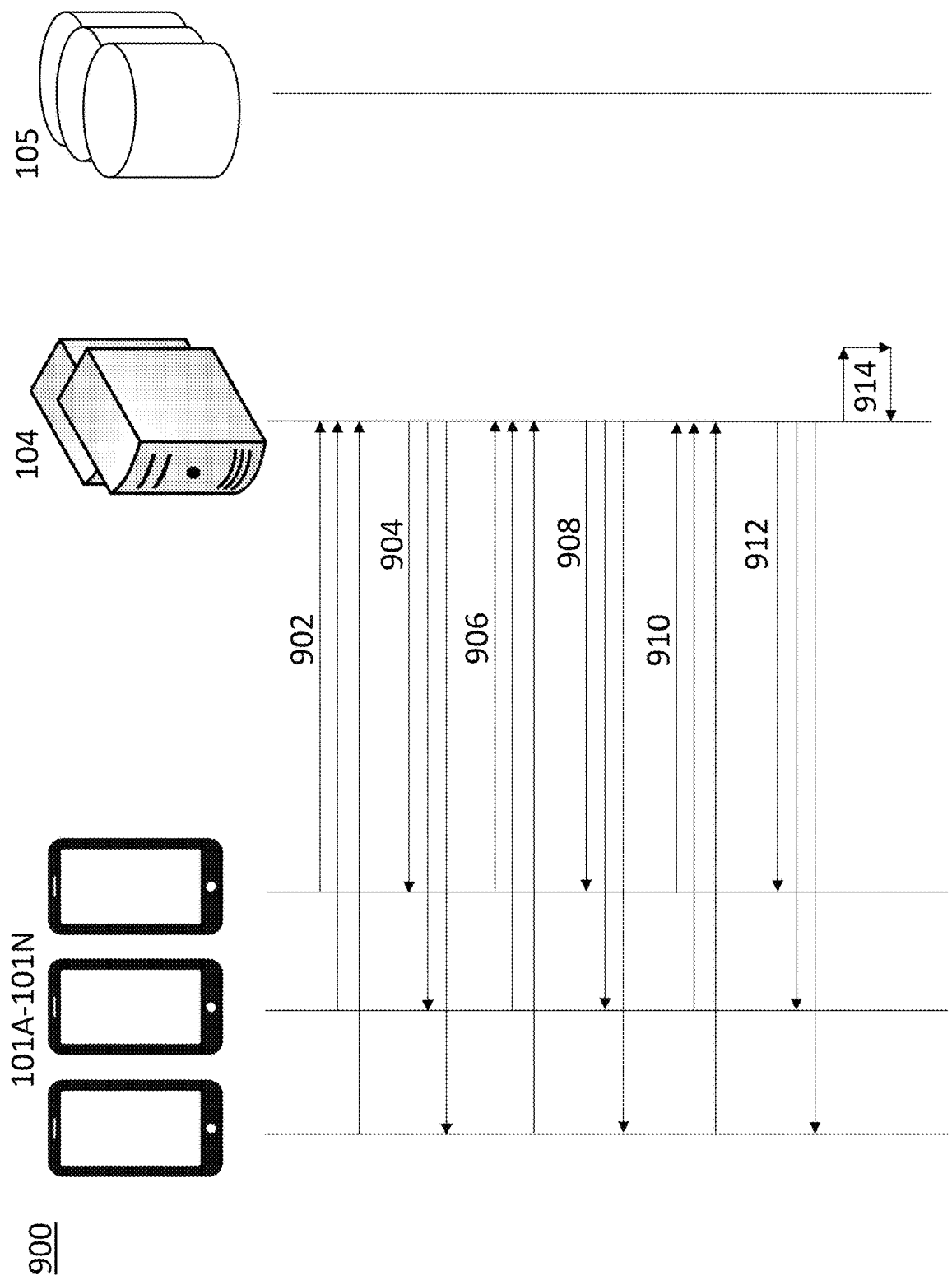

METHODS, APPARATUSES, AND COMPUTER PROGRAM PRODUCTS FOR PROVISION OF AUTOMATED INTERACTIVE ELECTRONIC SEATING CHARTS

CROSS-REFERENCE TO RELATED APPLICATIONS

The present application claims is a continuation of and claims priority to U.S. application Ser. No. 17/478,675, titled "METHODS, APPARATUSES, AND COMPUTER PROGRAM PRODUCTS FOR PROVISION OF AUTOMATED INTERACTIVE ELECTRONIC SEATING CHARTS," filed Sep. 17, 2021, which claims priority to U.S. Provisional Application No. 63/079,874, titled "METHODS, APPARATUSES, AND COMPUTER PROGRAM PRODUCTS FOR PROVISION OF AUTOMATED INTERACTIVE ELECTRONIC SEATING CHARTS," filed Sep. 17, 2020, the contents of which are incorporated by reference herein in their entireties.

FIELD

The present application is generally related to methods, apparatuses, and computer program products for digital provisioning of physical units of a venue based on a floor-plan of a digital image.

BACKGROUND

Seating charts enable customers and ticket sellers to visualize seating arrangements for assigned seats within a venue for a performance or event. Seating charts can be used for an array of events and venues ranging from small personal events like a wedding, to corporate events and parties, up to large scale sporting events or concerts. At smaller personal midsize events, venues may provide flexible seating arrangements based on the needs of a particular event resulting in a wide range of possible seating arrangements. While at larger scale venues, such as stadiums, the seating arrangement may be at least partially fixed allowing for less possible seating arrangements. However, larger concert halls and stadiums may still have very intricate seating arrangements numbering in the tens of thousands of seats and even then the seating arrangements may still be rearranged. Therefore, a single venue may have multiple seating charts to represent at least some of the possible seating arrangements.

Within a seating chart, seats may be assigned names or numbers and can be organized into larger groups, sometimes distinguishable by a color-code scheme. Seating charts for stadiums often have seats organized into large sections which are made up of smaller areas such as rows, balconies, and walkways. Seating sections at larger venues may also be arranged into multiple levels where sections at least partially overlap each other. For example, some stadiums may be arranged into levels such that an upper level of seats may partially overhangs a lower section of seats. Each seat within a seating chart is positioned in order to provide a visual representation of its location in relation to other seats as well as the entire layout of the venue. For example, seating sections on a second level of a stadium may be colored in red tones to distinguish them from first level seating which may be illustrated with blue tones. Additionally, standing space may be colored green on a seating chart to distinguish those areas from seating sections. Customer may utilize seating charts to identify a seat they would like to purchase for an upcoming event, and ticket sellers may use seating charts to track ticket sales and even price tickets based on the location of their corresponding seats.

There exists a need for automated interactive electronic seating charts which can provide a plurality of seating arrangements for a venue and allow for updates to seating charts as the physical space is changed.

SUMMARY

There Embodiments of the present disclosure are directed to dynamically building and transforming interactive electronic seating charts for a physical space. In example embodiments, seating charts are incorporated into a programmable computer model for representing features of the physical space associated with the seating chart. A digital image, and/or other digital documents, associated with a venue may be utilized to generate an electronic seating chart. According to example embodiments, features and physical properties of the venue may be extrapolated from the digital image. The electronic seating chart may comprise a three-dimensional model built from the ground up over the digital image. Along with seating quantity and configurations, the electronic seating chart may capture other architectural features of a venue that cannot be represented by traditional seating charts. For example, the shape and size of individual seats, steps, entrances and exits, obstructions to a seat's view (e.g., stadium structural columns), lighting arrangements, and similar details particular to a venue may be more fully captured by example embodiments.

Some embodiments, may be combined with reservation systems and further track seating arrangements particular to certain events along with ticket prices and seats sold for said events. For example, some venues may host dissimilar events such as football games and musical concerts. During a football game a large field is required at the center of the stadium, while during a musical concert, only a stage for the performance may be required. The stage may only occupy a small portion of the field allowing for additional seating or standing room proximate the stage. Example embodiments can configure a single venue with a plurality of electronic seating charts and ticket prices to accommodate a wide range of events. For example, the cost of a seat at a football game may be associated with a first price, while the same seat at a concert may be associated with a second price. Moreover, a venue may undergo construction projects, during its functional lifetime, to facilitate seating expansion, renovation, or repairs. In example embodiments, changes to physical space, due to construction, can be updated in the electronic seating chart. For example, additional levels and sections of seats may be added to a venue and the electronic seating charts may be updated accordingly. Furthermore, example embodiments may incorporate additional features such as, for example, those discussed in relation to physical allocation of space as disclosed in U.S. Provisional Application Ser. No. 62/992,915, filed Mar. 21, 2020, and U.S. application Ser. No. 16/900,590, filed Jun. 12, 2020, the contents of which are incorporated herein by reference in their entirety for all purposes.

There In example embodiments, an electronic seating chart may identify each individual seat of a venue. Individual seat identification may include grouping seats into sections, subsections, rows, or the like and associating each grouping with an identifier such as a color, name, number, the like, or combinations thereof. For example, a section of seats may be identified as section 1A because it is the first section on the first level of a venue. Example section 1A may be further split into equal quadrants, or subsections, each identified as quadrant 1-4 respectively, each quadrant may be further divided into rows identified by a letter with seats labeled by a number. In accordance with such an example, some embodiments may be configured to identify an individual seat out of hundreds of thousands of seats in a venue according to a section-quadrant-row-seat identification scheme. For example, a ticket seller may be able to identify the location and price associated with individual seat 1A-3-H-32 for a particular event.

There Physical properties of a group of seats or an individual seat may also be identified in accordance with example embodiments. The physical properties for seats may include a type of seat, an orientation and position relative to other venue structures (e.g., a field, stage, etc.), size, shape, the like, or combinations thereof. Seats may be represented by a three-dimensional model rendered to appear visually similar to its physical counterpart. For example, a bench seat may be rendered in example embodiments as a three-dimensional model of a bench. In other embodiments, seats and/or sections of seats may be represented by icons (e.g., a cube, box, etc.) associated with a particular color, texture, in-fill pattern, the like, or combinations thereof. For example, standing room sections may be shown as a larger green cube positioned in a three-dimensional model in front of a stage structure. Further, handicap accessible seating sections may be represented by a spherical blue striped icon located adjacent to entrance and exit gateways. In example embodiments, seating representations may transition from a first type to a second type. For example, when viewing a three-dimensional model of a seating chart at a high level the seating sections may be rendered as icons, however, when transitioning the view closer to a particular section then individual seats may be represented by respective three-dimensional models. In some embodiments, it may be possible to toggle between three-dimensional models and icons for individual seats and/or sections of seats.

In some embodiments, a seat's representation (e.g., model, icon, color, etc.) may change to indicate additional variable information, for example, a current ticket price, a future or past ticket price, a reservation status (e.g., already purchased for an event, reserved for a season pass holder, etc.), the like, or combinations thereof. For example, a reserved seat may be rendered with a red dot on its icon to indicate that it is no longer available to purchase. These additional variable features may be applied dynamically to an electronic seating chart to improve services rendered by a reservation system.

Example embodiments, may generate structured partitions within a physical space into volumetric cells. These partitions may be inferred from a digital image or a combination of digital images and/or other referential data structures. For example, a digital image may be partitioned into squares cells which would be generated as volumetric cells in an electronic seating chart. Further, the digital image's square cells may be colored and that color may correspond to a price referenced in a digital document, such as a price spread sheet. The cells partition a represented physical space covering the available space completely by abutting each other side by side, without overlap between cells. In some embodiments, there is a single cell for each seat and there may also be cells for non-seat physical features or unoccupied spaces. The decomposition of a digital image and associated space into cells makes it possible to perform operations, such has infer measurements based on a reference dimension, and employ analytical algorithms. Example analytical algorithms may comprise the safe seating algorithm, path finding algorithms (e.g., a path from an entrance to a particular seat), or pricing algorithms.

Along with generating a physical space and features therein, example embodiments may transform the underlying geometries of a venue after initial generation. For example, physical features that may be modified for an electronic seating chart may include the size, shape, and/or aesthetic characteristics for floors and walkways, sections, angles between sections, landings, elevations, aisles, steps, risers, rooms (e.g., press rooms, skyboxes, etc.), stages, fields, columns, entrances and exits, walls, and other physical objects associated with a space of a venue.

In accordance with example embodiments, an interactive tool set may provide an interface between an electronic seating chart and a user to receive interactions to build a new electronic seating chart and/or transform at least some features of an existing electronic seating chart. The interactive tool set may be integrated into a reservation, or ticketing, system and include features for automatically generating at least some features associated with a venue into an electronic seating chart. In some embodiments, the interactive tool set may be configured as part of a wider online system which allows for electronic seating charts to be remotely built, transformed, and shared by a plurality of users. For example, a ticketing service may have multiple locations selling tickets for the same events and as a ticket is sold at one location a salesman, or an automated function, may update an electronic seating chart using the interactive tool set to indicate to all ticketing locations that the corresponding seat is no longer available. Further, for example, electronic seating charts may be stored at a ticketing service's corporate location. The corporate office may update the electronic seating charts based on changes made to the physical space and then such modifications are automatically, and remotely, available at each of the ticketing service's sales locations. In some embodiments, an interactive online tool set may send or receive transmission between different entities, such as a ticketing service and a venue owner and/or operator. For example, a ticketing service may receive electronic seating charts transmitted from a venue operator as events are scheduled at the venue and tickets can be sold.

In embodiments, the interactive tool set may be integrated into the reservation, or ticketing, system to receive customer relationship management (CRM) data from one or more ticket service agents or customers. The interactive tool set may comprise an online graphical user interface accessible to the one or more ticket service agents or customers to purchase seats, make adjustments to an existing reservation, opt to exchange or resell season tickets, and other transactions via the electronic seating chart. For example, one or more ticket service agents may transmit, via a computing device, an indication that a particular seat within the electronic seating chart has been sold and the interactive tool set may automatically redistribute seats within the electronic seating chart based on, for example, based on a safe seating algorithm. In embodiments, the interactive tool set via the online graphical user interface may receive one or more ticket service customer details (e.g., contact information, phone number, mailing address, etc.).

In embodiments, the interactive tool set via the online graphical user interface may receive one or more ticket service customer preferences or ratings for a particular seat or position within the electronic seating chart. For example, a venue may be required to redistribute seats that have already been sold to customers due to public safety concerns (e.g., social distancing, venue refurbishment, etc.) and the ticket service may utilize the electronic seating chart to effect such redistributions in a way that satisfies the safety requirements (such as using a safe seating algorithm to find replacement seats) and to notify customers (e.g., season ticket holders, seat licensing entities, one time ticket holders, etc.) via the online graphical user interface of the new seats. For example, a ticket service may automatically redistribute seats according to a safe seating algorithm and the online graphical user interface may automatically transmit a notification (e.g., an email, SMS text message, voicemail, etc.) to each customer who is listed in a repository associated with the electronic seating chart for the redistributed event. In some cases there may be multiple possibilities for new seats, including options for different priced seats, which may require the customer's selection and acceptance. Upon receipt of the notification each customer may transmit a selection for a new seat, a satisfaction rate, a message, or the like via a user interface.

In embodiments, the notification may indicate to the customer a user interface for responding to the notification (e.g., a return phone number to call, a website address to access the online graphical user interface associated with the electronic seating chart, a survey webpage link, the like, or combinations thereof). In embodiments, upon receipt of the customer's notification response the response, or portions thereof, may be stored in a data structure associated with the electronic seating chart. For example, a customer's personally identifiable information (e.g., name, address, phone number, email, etc.) may be stored in a repository and assigned to a particular seat number or other seat identifier. In some embodiments, a customer may be required, such as by a ticketing service, to provide personally identifiable information and a payment method before purchasing one or more tickets via the online graphical user interface associated with the ticketing services integrated reservation and electronic seating chart system.

In some embodiments, a customer may be required to input, via online graphical user interface, one or more payment method items (e.g., credit card number, credit expiration date, security code, a bank account number, an account holder name, the like, or combinations thereof). In some embodiments, a customer may be able to register for an online graphical user interface account to access the online graphical user interface, ticketing service system, or electronic seating chart without inputting payment method information. In some embodiments, a ticket service agent may receive cash, or other payments, via an in person transaction with the customer (e.g., at ticket kiosk, etc.) and can assign the purchased tickets to the customer's account with the integrated ticket system and/or the online graphical user interface associated with the electronic seating chart. In embodiments, the online graphical user interface may provide means for a customer to automatically purchase tickets associated with an electronic seating chart as they become available.

In embodiments, season ticket holders or managing seating licensees may be given preference over one-time ticket holders. For example, a venue may redistribute seating arrangements for an entire season (e.g., basketball season, hockey season, football season, etc.) based on the safe seating algorithm to conform to public health orders. If the redistribution of seating arrangements does not accommodate all current ticket holders then the current ticket holders may be sorted into a plurality of different categories and each of the different categories may be given preference for ticket cancellation and refunds. For example, one-time ticket holders may be sorted in to a one-time ticket holders category while season ticket holders may be sorted into one or more season ticket holder categories. The one-time ticket holders may be cancelled and refunded before the season ticket holders based on the priority preference assigned to the two respective groups.

In embodiments, tickets may be cancelled and refunded based on a first-come-first-serve basis. For example, the one-time ticket holders category may be sorted based on a date and time a ticket was purchased and one-time ticket holders with later dates and times may be cancelled and refunded before one-time ticket holders with earlier dates and times. In some embodiments, preference for cancellation and refunding may be given to long term customers (e.g., customers who have been season ticket holders for multiple years as opposed to first time season ticket holders). A customer account may be associated with an account creation date, a number of tickets previously purchased, a type of ticket previously purchased (e.g., season tickets, one-time tickets, etc.), an alumni status identifier, or other similar customer metrics.

In embodiments, an alumni status identifier may identify a customer as an alumni of a university or college associated with a venue or event (e.g., a degree holding graduate of a college that is selling tickets to a collegiate sporting event). In some embodiments, an alumni status identifier may identify a customer as a former employee or performer associated with a venue (e.g., opera singer, sports team coach, sports team player, band member, theatre usher, venue manager, or the like). The priority preference given to a customer may be based, at least partially, on the customer metrics stored in association with their customer account data (e.g., an account creation date, an alumni identifier, etc.). In embodiments, cancellation notifications may be transmitted by the interactive tool set via the online graphical user interface and the interactive tool set may transmit a refund interaction signal to the ticket reservation system of the ticketing service company.

In embodiments, a priority preference score may be associated with a customer account based on stored customer metrics associated with the customer account. For example, customer accounts may be assigned a numerical value for each customer metric associated therewith and, for example, the higher the customer's priority preference score the less likely they are to have their tickets cancelled and refunded to make space for compliance with a safe seating redistribution scheme. For example, a first customer account with season tickets and an alumni identifier identifying them as a former employee may be assigned a priority preference score of 100, while a second customer account with season tickets for the current season, historical data showing season tickets for the past five seasons, and an alumni identifier marking them as a former team coach may be assigned a priority preference score of 500. In such an example, the first customer account may be selected for ticket cancellation and refunding before the second account.

In embodiments, customers may be given the ability to cancel and refund their ticket purchase or to move their seat in accordance with the safe seating redistribution scheme. For example, a customer may be notified and directed to access the online graphical user interface and through the online graphical user interface they will be allowed to request a refund or select an available seat by way of the electronic seating chart. In such embodiments, the selection made by the customer via the online graphical user interface and the electronic seating chart may be automatically stored in an associated repository and available in real-time to other ticket service agents and customers using the online graphical user interface and the electronic seating chart.

In embodiments, each attendee present at an event may have to be registered with the ticketing services integrated reservation and electronic seating chart system. In embodiments, attendee registration data may be stored for a particular event (e.g., in the seating data repository for the electronic seating chart, etc.) and may comprise a plurality of tickets/seats sold as a group, with at least one customer's name (e.g., at least a parent/guardian/adult if purchasing multiple tickets for a group of minors) and contact information (e.g., a phone number, etc.) being recorded. The personal data collected for attendees may be stored and utilized to transmit notifications to support contact tracing, after an event, in an instance a public health concern (e.g., virus, bacteria, etc.) case is reported by utilizing the seating layout and measurements calculated within the electronic seating chart to determine which other parties were seated within a suitable proximity of the infected person and to utilize the stored contact information of the proximate parties for notifications. In some embodiments, after each event, a snapshot of the attendance registration can be archived for notification purposes along with the associated electronic seating chart data (e.g., location of each attendees seat, etc.).

In embodiments, a customer may be able to notify other customers via the online graphical user interface associated with the ticketing services integrated reservation and electronic seating chart system that they are selling their ticket (e.g., via a discussion board, forum, or re-sale section of the online graphical user interface or a website associated therewith). In such embodiments, other customers may be notified of the re-sale via the online graphical user interface and would be able to purchase, bid, or make an offer for the re-sale ticket via the online graphical user interface. In some embodiments, the ticket service company may reserve a buy-back option (e.g., the ticket service company would be given priority to purchase the tickets back before other customers are given a chance to purchase the tickets) or set restrictions on re-sale prices (e.g., 90% to 110% of the original ticket price) to prevent price gouging or future sale losses.

In embodiments, the online graphical user interface associated with the ticketing services integrated reservation and electronic seating chart system may be configured to collect, store, transform, and report business analytic data associated with a venue, event, sports season, or the like (e.g., electronic seating chart). Business analytics data may include one or more of a number of tickets sold, a number of seating types sold (e.g., bench seat sales versus luxury seat sales, etc.), number of cancellations, venue occupancy for an event, seating distributions for types of events, ticketing agent sale volume per event(s), customer satisfaction rating (e.g., report via surveys distributed by the online graphical user interface, event exit polls, support line call-ins, or the like), payment method types, ticket re-sale turnover, customer distributions for events based on customer geographic locations, or the like.

In some embodiments, an electronic seating chart may be utilized in combination with the digital enhancement or virtualization of actual events (e.g., a 3D graphics rendered virtual simulcast of a live sporting event). For example, a venue may be equipped with 3D tracking cameras over a sports field (e.g., basketball court, baseball field, football field, tennis court, etc.) and as the players are tracked in real-time by the 3D tracking cameras over the sports field a 3D rendered avatar representing the player (e.g., the players location on the field, physical attributes such as height, the forward facing orientation of the player, movements of the players arms and legs, etc.) may be shown within the electronic seating chart (e.g., a field area within the electronic seating chart). In embodiments, avatars representing viewers may be rendered to respective seating positions with the electronic seating chart to show occupancy of the venue in real-time. In some embodiments, the electronic seating chart will be used to both sell an unlimited number of new tickets to the virtualized event from one of the existing seats, and as the interface and platform for experiencing the virtualized event. In some embodiments, in a similar way, customers for a live event will also be able to experience unlimited replays of the virtualization of the live event from the same seat they purchased for the live event.

In some embodiments, the interactive tool set may receive at least a digital image, comprising a photo of a venue, a two-dimensional top-down seating chart, the like, or combinations thereof, and automatically generate an electronic seating chart. In other embodiments, the interactive tool set may receive, for example, by an Internet connection, at least a pre-existing electronic seating chart and automatically transform it based on some digital input (e.g., a user interface signal, a digital image, etc.). The interactive tool set may comprise a user interface to receive interactions and render outputs based on those interactions in order to transform an electronic seating chart. Further, the user interface may receive interactions and render outputs based on those interactions in order to generate an electronic seating chart without a digital image, or other digital document, as a point of reference. For example, the interactive tool set may comprise means for designing and generating an electronic seating chart based at least partially on the interactions of a user via a computing device. The user interactions may include defining seating parameters for the electronic seating chart. In some embodiments, the interactive tool set may receive a digital file associated with a model generated by a computer aided design application, for example, a three-dimensional model of a seat, railing, flooring, etc., and through user interactions place the received three-dimensional model into an electronic seating chart.

In embodiments, the interactive tool set may receive, or access for retrieval of data therein, a seating manifest file comprising one or more seating parameters, or the like. In accordance with such embodiments, one or more rows of a seating area may be dynamically filled with one or more seating icons. Seat information may be retrieved from the seating manifest file to be dynamically associated with a respective seating icon. For example, the manifest file may comprise a seat number (e.g., Section 100, Row A, Seat 45), a seat type (e.g., bench seat, etc.), and a sales status (e.g., sold/unsold for a particular venue event) for each respective seat described therein and this information may be associated in the data structure of the electronic seating chart with a respective seating icon and renderable via a graphical user interface (e.g., a pop-up menu rendered in response to a received interaction signal). In embodiments, a conflict may be detected between a dynamically generated seating area and the seating parameters of a seating manifest. In such embodiments, the seating parameters of a seating manifest may override (e.g., add to, delete, transform, etc.) the dynamically generated seating area configuration. In some such embodiments, an interactive graphical interface element (e.g., a warning message with one or more graphical tool elements for receipt of an interaction signal) is generated to notify one or more users of the conflict between the seating manifest and the dynamically generated seating area. An interactive signal may be received, via the interactive graphical interface element, to indicate that seating parameters should be utilized from the seating manifest. An interactive signal may be received, via the interactive graphical interface element, to indicate that seating parameters from both the seating manifest and the dynamically generated seating parameters should be removed. In such an embodiment, the seating parameters can be entered via the interactive graphical interface element.

According to one aspect of the present disclosure, an apparatus is provided for generating one or more electronic seating charts for a physical space comprising a plurality of physical units arranged according to a fixed arrangement. The apparatus comprises at least one processor and at least one memory storing instructions that, when executed by the at least one processor, cause the apparatus to receive, from a first computing device, a digital image, or the like (e.g., a seating manifest, etc.). In embodiments, the apparatus is further caused to transmit, to the first computing device, an interface configured for rendering the digital image. In embodiments, the apparatus is further caused to receive, from the first computing device, a physical space allocation input, the physical space allocation input defining one or more physical unit interface elements overlaid atop the digital image. In embodiments, the apparatus is further caused to transmit, to the first computing device, a first modified interface configured for rendering a seating section interface element based on the one or more physical unit interface elements overlaid atop the digital image. In embodiments, the apparatus is further caused to receive, from the first computing device, one or more seating parameters. In embodiments, the apparatus is further caused to transmit, to the first computing device, a second modified interface configured for rendering a three-dimensional model of a physical space represented by the digital image, wherein the second modified interface comprises one or more seating area interface sub-elements within the seating section interface element, the one or more seating area interface sub-elements comprising a plurality of volumetric cells. In embodiments, the apparatus is further caused to generate, based at least in part on an approval signal received from the first computing device, a physical allocation data structure based on the three-dimensional model of the physical space represented by the digital image.

In some embodiments, the one or more seating parameters comprise one or more of a row quantity, a row depth, a seat width, a joint angle, or a rise height. In some embodiments, the at least one memory further stores instructions that, when executed by the at least one processor, cause the apparatus to transmit the physical allocation data structure to the first computing device. In some embodiments, the at least one memory further stores instructions that, when executed by the at least one processor, cause the apparatus to receive, from the first computing device, color-coded definitions, wherein the color-coded definitions associate one or more of a color or an infill pattern of the digital image with one or more of a second physical unit, a location within the physical space, or a price. In some embodiments, the at least one memory further stores instructions that, when executed by the at least one processor, cause the apparatus to generate, based on at least the color-coded definitions, one or more of a second seating area interface sub-element or a pricing list for the physical space.

In some embodiments, the at least one memory further stores instructions that, when executed by the at least one processor, cause the apparatus to receive, from the first computing device, a seating area interaction, the seating area interaction comprising one or more of an addition interaction, a location interaction, or a deletion interaction. In some embodiments, the at least one memory further stores instructions that, when executed by the at least one processor, cause the apparatus to transform, based on the seating area interaction, the one or more seating area interface sub-elements. In some embodiments, the plurality of volumetric cells are graphical representations of at least a plurality of seats being distributed within the one or more seating area interface sub-elements according to the one or more seating parameters. In some embodiments, the plurality of seats is a maximum number of seats that can be distributed within the one or more seating area interface sub-elements based on at least one or more seat dimensions. In some embodiments, any additional spacing between seats in a row of seats is automatically evenly distributed between each seat of the row of seats.

In some embodiments, the at least one memory further stores instructions that, when executed by the at least one processor, cause the apparatus to receive, from the first computing device, a deletion interaction. In some embodiments, the at least one memory further stores instructions that, when executed by the at least one processor, cause the apparatus to remove, based on the deletion interaction, one or more physical units from the interface. In some embodiments, the one or more seating parameters comprise a relative unit of scale, the relative unit of scale comprising a row depth unit (RDU) with which the plurality of physical units are rendered to scale. In some embodiments, each volumetric cell of the plurality of volumetric cells comprises a number based on a numbering scheme. In some embodiments, the digital image comprises overlapping levels. In some embodiments, the digital image comprise a photograph of the physical space. In some embodiments, the one or more seating area interface sub-elements comprise a physical feature, the physical feature comprising a seat, aisle, wall, rail, balcony, structural support, stairs, restrooms, concessions, parking, or doorway.

According to one aspect of the present disclosure, an non-transitory computer readable storage medium comprising instructions is provided. The non-transitory computer readable storage medium comprises instructions for generating one or more electronic seating charts for a physical space comprising a plurality of physical units arranged according to a fixed arrangement. When executed by a processor, the instructions cause an apparatus comprising at least one processor and at least one memory to receive, from a first computing device, a digital image, or the like (e.g., a seating manifest, etc.). In embodiments, the instructions further cause the apparatus to transmit, to the first computing device, an interface configured for rendering the digital image. In embodiments, the instructions further cause the apparatus to receive, from the first computing device, a physical space allocation input, the physical space allocation input defining one or more physical unit interface elements overlaid atop the digital image. In embodiments, the instructions further cause the apparatus to transmit, to the first computing device, a first modified interface configured for rendering a seating section interface element based on the one or more physical unit interface elements overlaid atop the digital image. In embodiments, the instructions further cause the apparatus to receive, from the first computing device, one or more seating parameters. In embodiments, the instructions further cause the apparatus to transmit, to the first computing device, a second modified interface configured for rendering a three-dimensional model of a physical space represented by the digital image, wherein the second modified interface comprises one or more seating area interface sub-elements within the seating section interface element, the one or more seating area interface sub-elements comprising a plurality of volumetric cells. In embodiments, the instructions further cause the apparatus to generate, based at least in part on an approval signal received from the first computing device, a physical allocation data structure based on the three-dimensional model of the physical space represented by the digital image.

In some embodiments, the one or more seating parameters comprise one or more of a row quantity, a row depth, a seat width, a joint angle, a row height, or a riser height. In some embodiments, the instructions, when executed by the processor, further cause the apparatus to transmit the physical allocation data structure to the first computing device. In some embodiments, the instructions, when executed by the processor, further cause the apparatus to receive, from the first computing device, color-coded definitions, wherein the color-coded definitions associate one or more of a color or an infill pattern of the digital image with one or more of a second physical unit, a location within the physical space, or a price. In some embodiments, the instructions, when executed by the processor, further cause the apparatus to generate, based on at least the color-coded definitions, one or more of a second seating area interface sub-element or a pricing list for the physical space.

In some embodiments, the instructions, when executed by the processor, further cause the apparatus to receive, from the first computing device, a seating area interaction, the seating area interaction comprising one or more of an addition interaction, a location interaction, or a deletion interaction. In some embodiments, the instructions, when executed by the processor, further cause the apparatus to transform, based on the seating area interaction, the one or more seating area interface sub-elements. In some embodiments, the plurality of volumetric cells are graphical representations of at least a plurality of seats being distributed within the one or more seating area interface sub-elements according to the one or more seating parameters. In some embodiments, the plurality of seats is a maximum number of seats that can be distributed within the one or more seating area interface sub-elements based on at least one or more seat dimensions. In some embodiments, any additional spacing between seats in a row of seats is automatically evenly distributed between each seat of the row of seats.

In some embodiments, the instructions, when executed by the processor, further cause the apparatus to receive, from the first computing device, a deletion interaction. In some embodiments, the instructions, when executed by the processor, further cause the apparatus to remove, based on the deletion interaction, one or more physical units from the interface. In some embodiments, the one or more seating parameters comprise a relative unit of scale, the relative unit of scale comprising a row depth unit (RDU) with which the plurality of physical units are rendered to scale. In some embodiments, each volumetric cell of the plurality of volumetric cells comprises a number based on a numbering scheme. In some embodiments, the digital image comprises overlapping levels. In some embodiments, the digital image comprise a photograph of the physical space. In some embodiments, the one or more seating area interface sub-elements comprise a physical feature, the physical feature comprising a seat, aisle, wall, rail, balcony, structural support, stairs, restrooms, parking, concessions, walkways or doorways.

According to one aspect of the present disclosure, a computer implemented method is provided for generating one or more electronic seating charts for a physical space comprising a plurality of physical units arranged according to a fixed arrangement. The computer implemented method comprises receiving, from a first computing device, a digital image, or the like (e.g., a seating manifest, etc.). In embodiments, the computer implemented method comprises transmitting, to the first computing device, an interface configured for rendering the digital image. In embodiments, the computer implemented method comprises receiving, from the first computing device, a physical space allocation input, the physical space allocation input defining one or more physical unit interface elements overlaid atop the digital image. In embodiments, the computer implemented method comprises transmitting, to the first computing device, a first modified interface configured for rendering a seating section interface element based on the one or more physical unit interface elements overlaid atop the digital image. In embodiments, the computer implemented method comprises receiving, from the first computing device, one or more seating parameters. In embodiments, the computer implemented method comprises transmitting, to the first computing device, a second modified interface configured for rendering a three-dimensional model of a physical space represented by the digital image, wherein the second modified interface comprises one or more seating area interface sub-elements within the seating section interface element, the one or more seating area interface sub-elements comprising a plurality of volumetric cells. In embodiments, the computer implemented method comprises generating, based at least in part on an approval signal received from the first computing device, a physical allocation data structure based on the three-dimensional model of the physical space represented by the digital image.

In some embodiments, the one or more seating parameters comprise one or more of a row quantity, a row depth, a seat width, a joint angle, or a rise height. In some embodiments, the computer implemented method further comprises transmitting the physical allocation data structure to the first computing device. In some embodiments, the computer implemented method further comprises receiving, from the first computing device, color-coded definitions, wherein the color-coded definitions associate one or more of a color or an infill pattern of the digital image with one or more of a second physical unit, a location within the physical space, or a price. In some embodiments, the computer implemented method further comprises generating, based on at least the color-coded definitions, one or more of a second seating area interface sub-element or a pricing list for the physical space.

In some embodiments, the computer implemented method further comprises receiving, from the first computing device, a seating area interaction, the seating area interaction comprising one or more of an addition interaction, a location interaction, or a deletion interaction. In some embodiments, the computer implemented method further comprises transforming, based on the seating area interaction, the one or more seating area interface sub-elements. In some embodiments, the plurality of volumetric cells are graphical representations of at least a plurality of seats being distributed within the one or more seating area interface sub-elements according to the one or more seating parameters. In some embodiments, the plurality of seats is a maximum number of seats that can be distributed within the one or more seating area interface sub-elements based on at least one or more seat dimensions. In some embodiments, any additional spacing between seats in a row of seats is automatically evenly distributed between each seat of the row of seats.

In some embodiments, the computer implemented method further comprises receiving, from the first computing device, a deletion interaction. In some embodiments, the computer implemented method further comprises removing, based on the deletion interaction, one or more physical units from the interface. In some embodiments, the one or more seating parameters comprise a relative unit of scale, the relative unit of scale comprising a row depth unit (RDU) with which the plurality of physical units are rendered to scale. In some embodiments, each volumetric cell of the plurality of volumetric cells comprises a number based on a numbering scheme. In some embodiments, the digital image comprises overlapping levels. In some embodiments, the digital image comprise a photograph of the physical space. In some embodiments, the one or more seating area interface sub-elements comprise a physical feature, the physical feature comprising a seat, aisle, wall, rail, balcony, structural support, stairs, restrooms, parking, concessions, or doorways.

Other embodiments include corresponding systems, methods, and computer programs, configured to perform the operations of the apparatus, encoded on computer storage devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
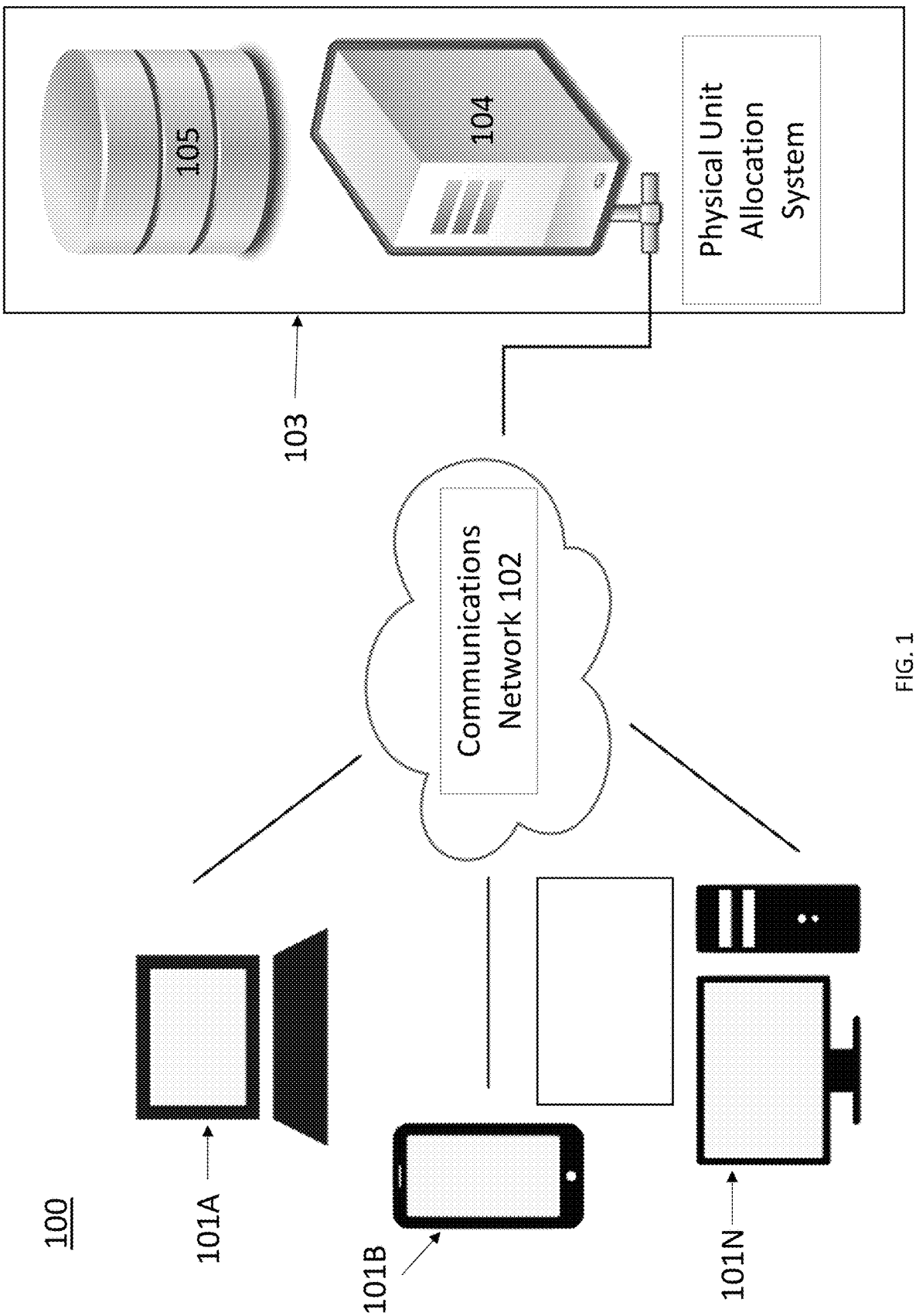
Figure 2:
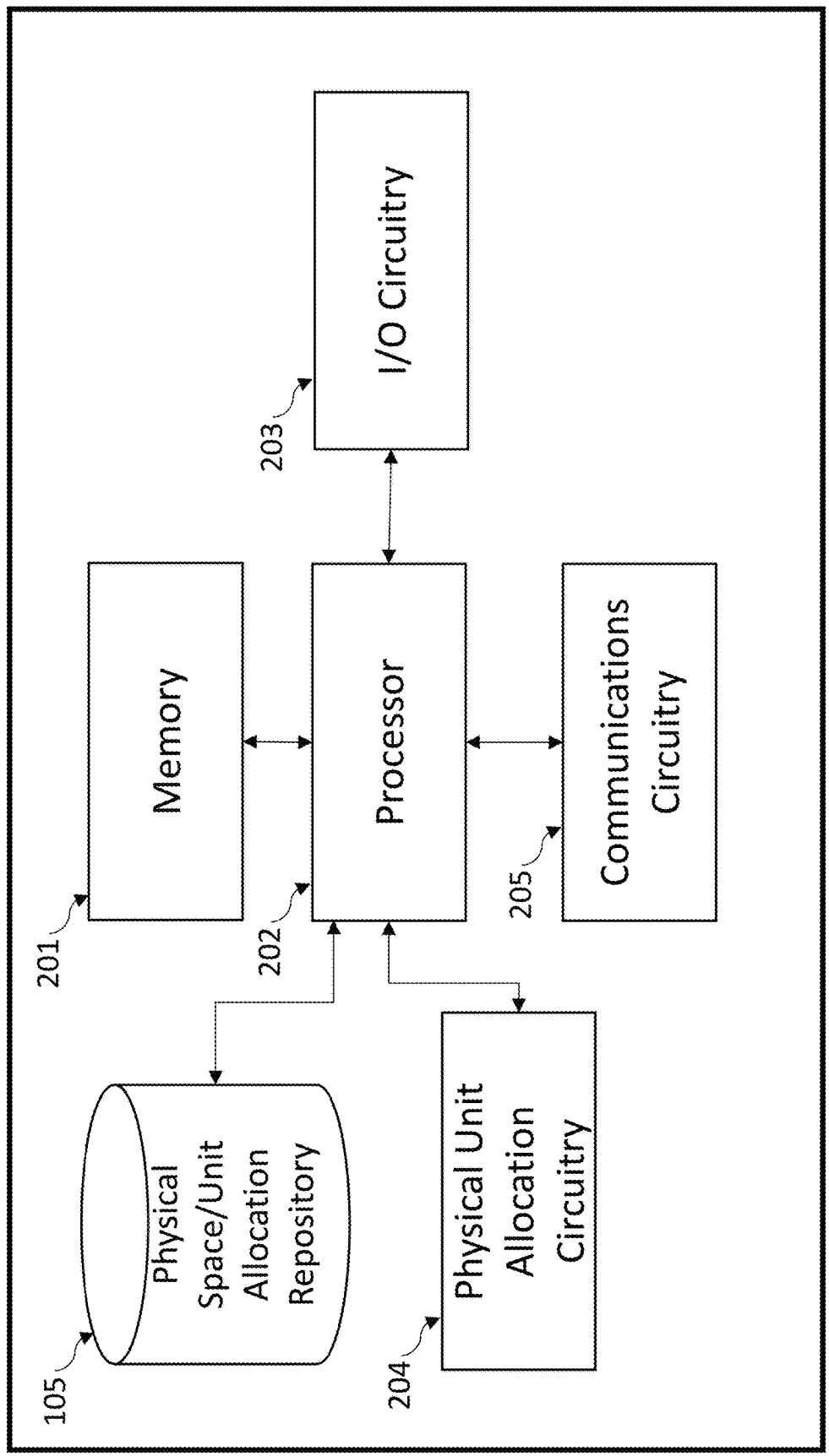
Figure 3A:
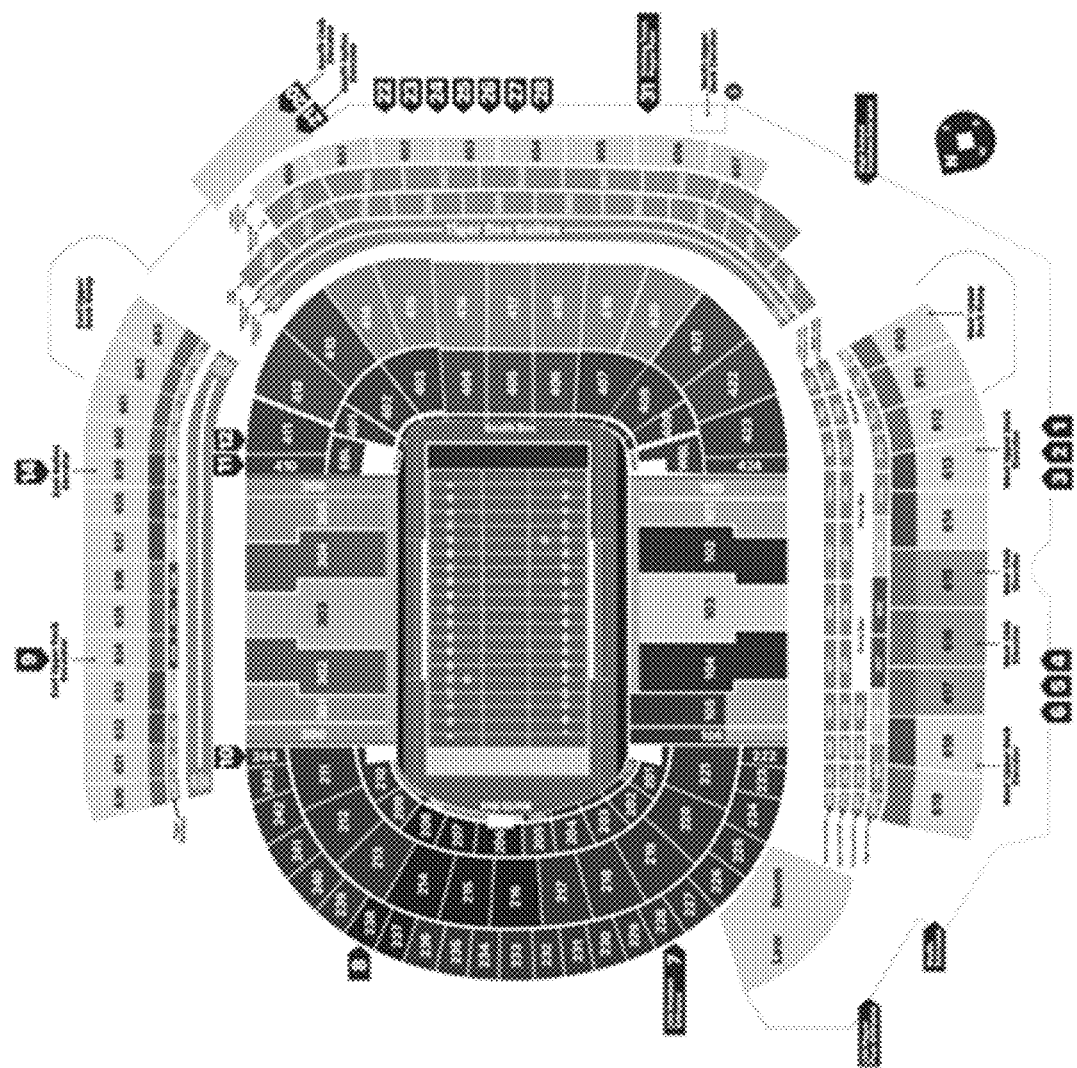
Figure 3B:
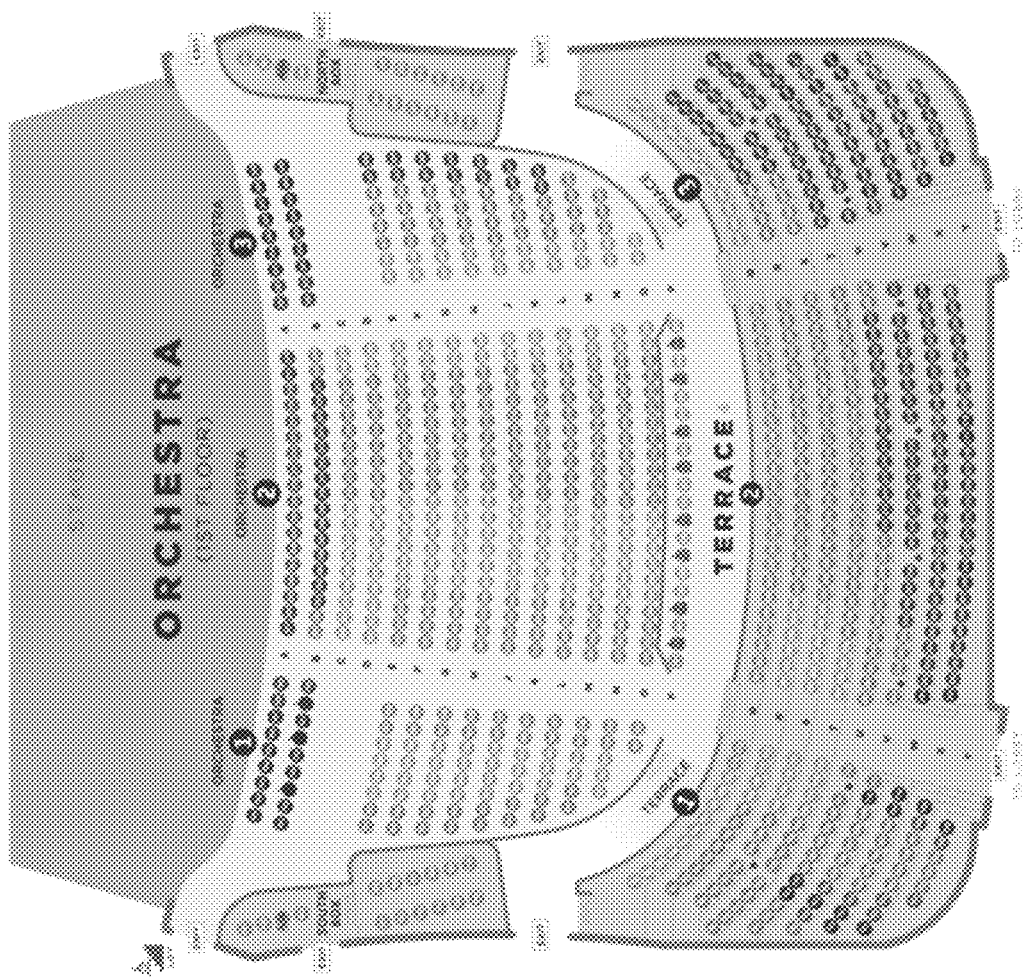
Figure 4A:
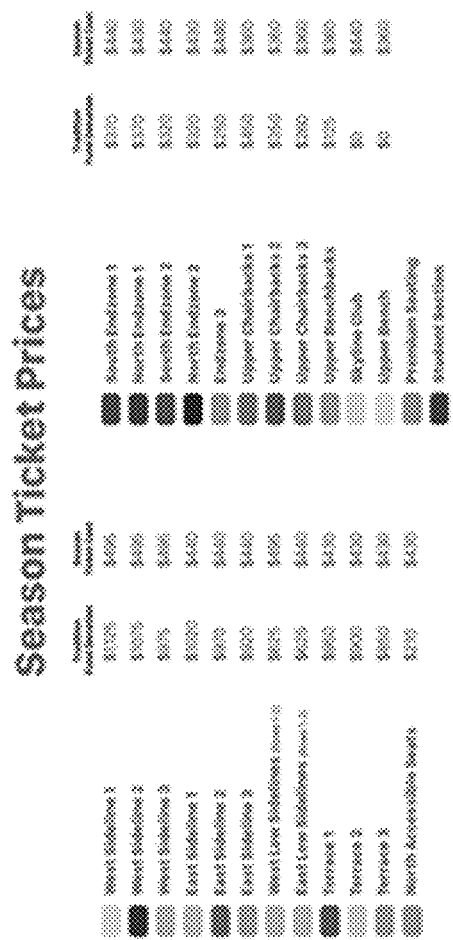
Figure 4B:
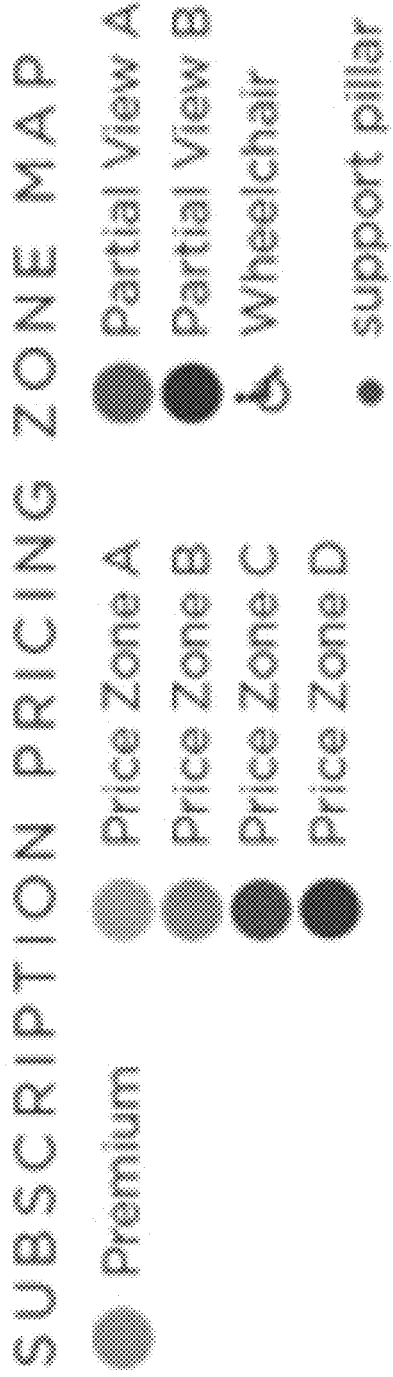
Figure 5:
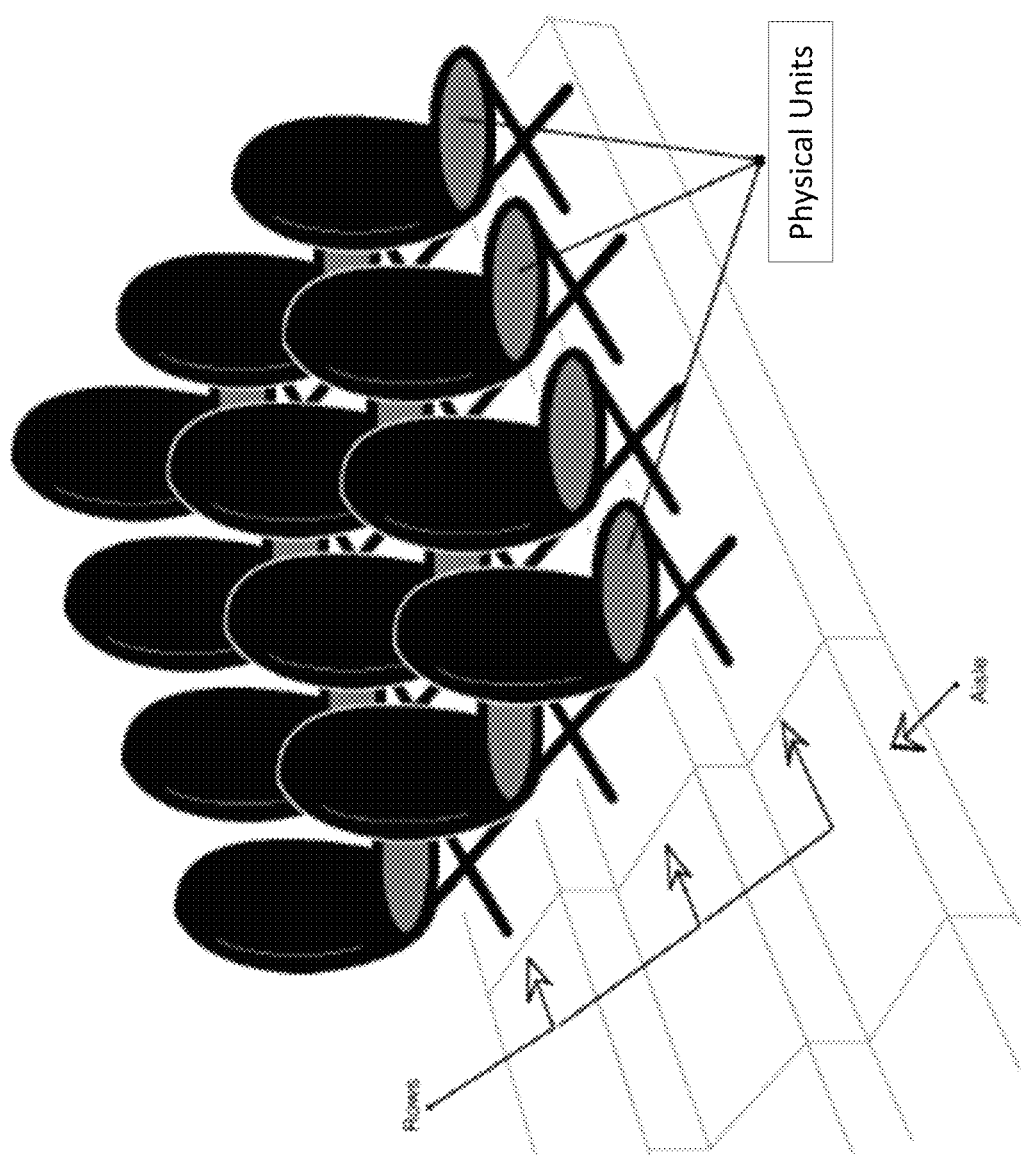
Figure 6:
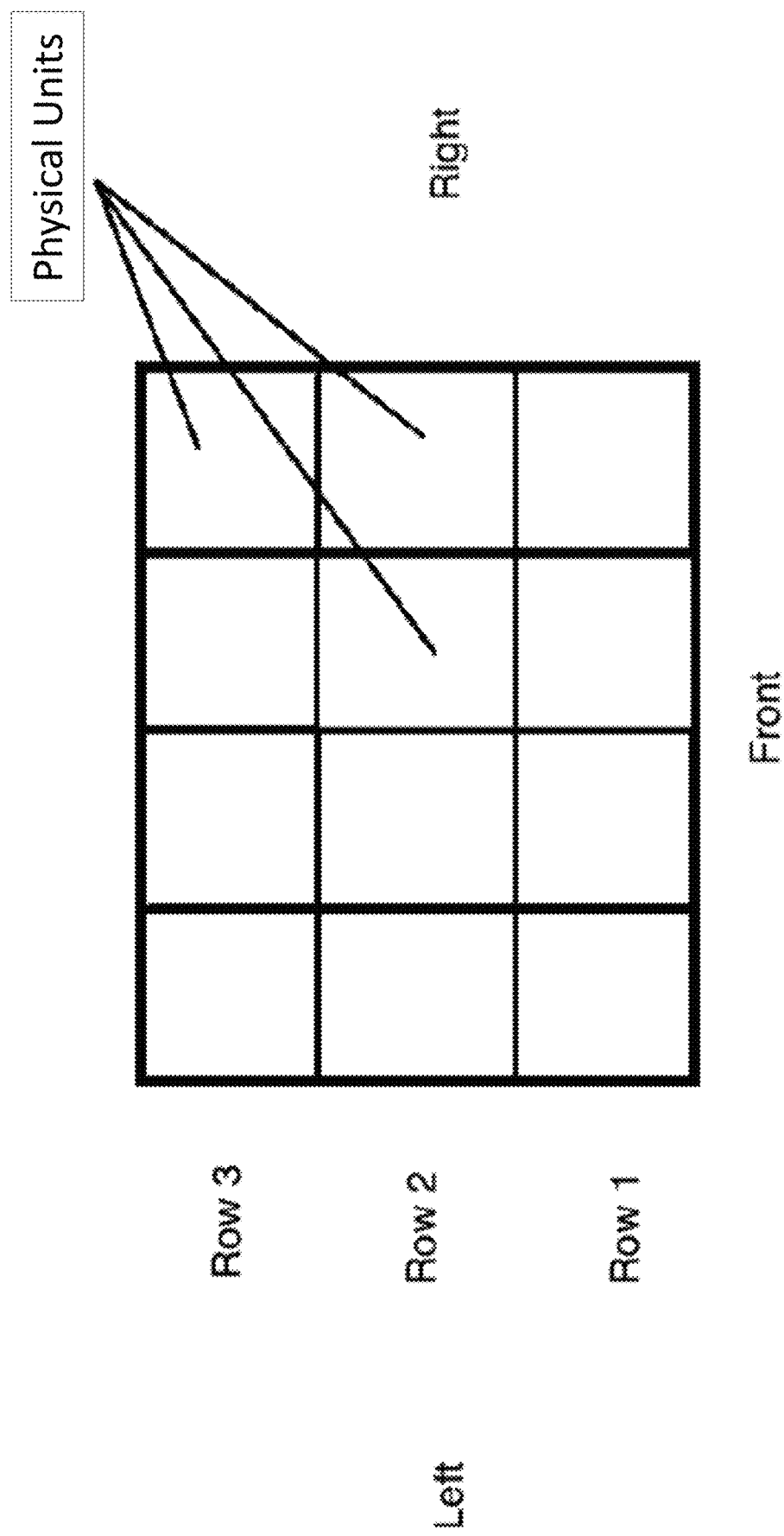
Figure 7A:
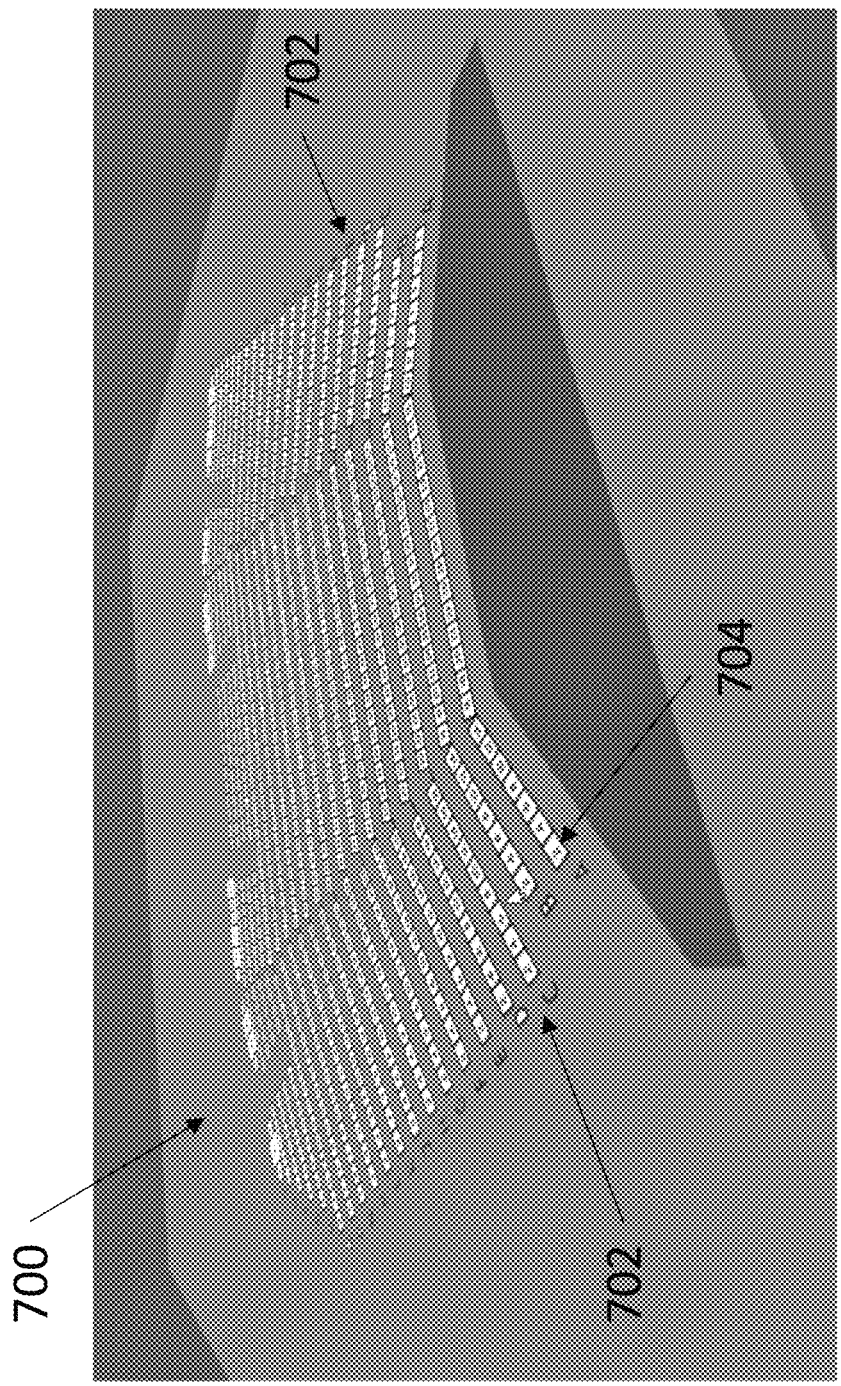
Figure 7B:
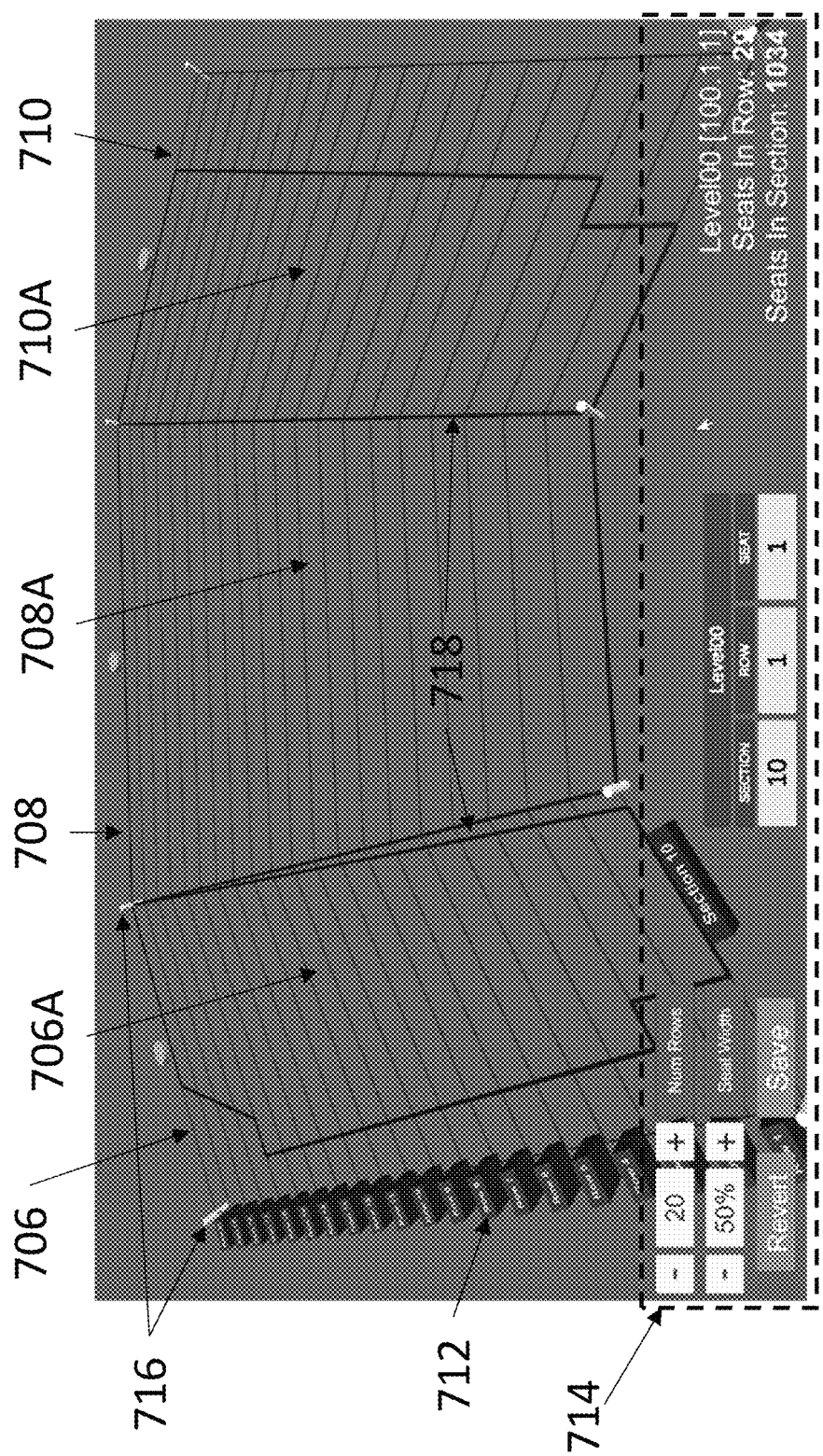
Figure 8A:
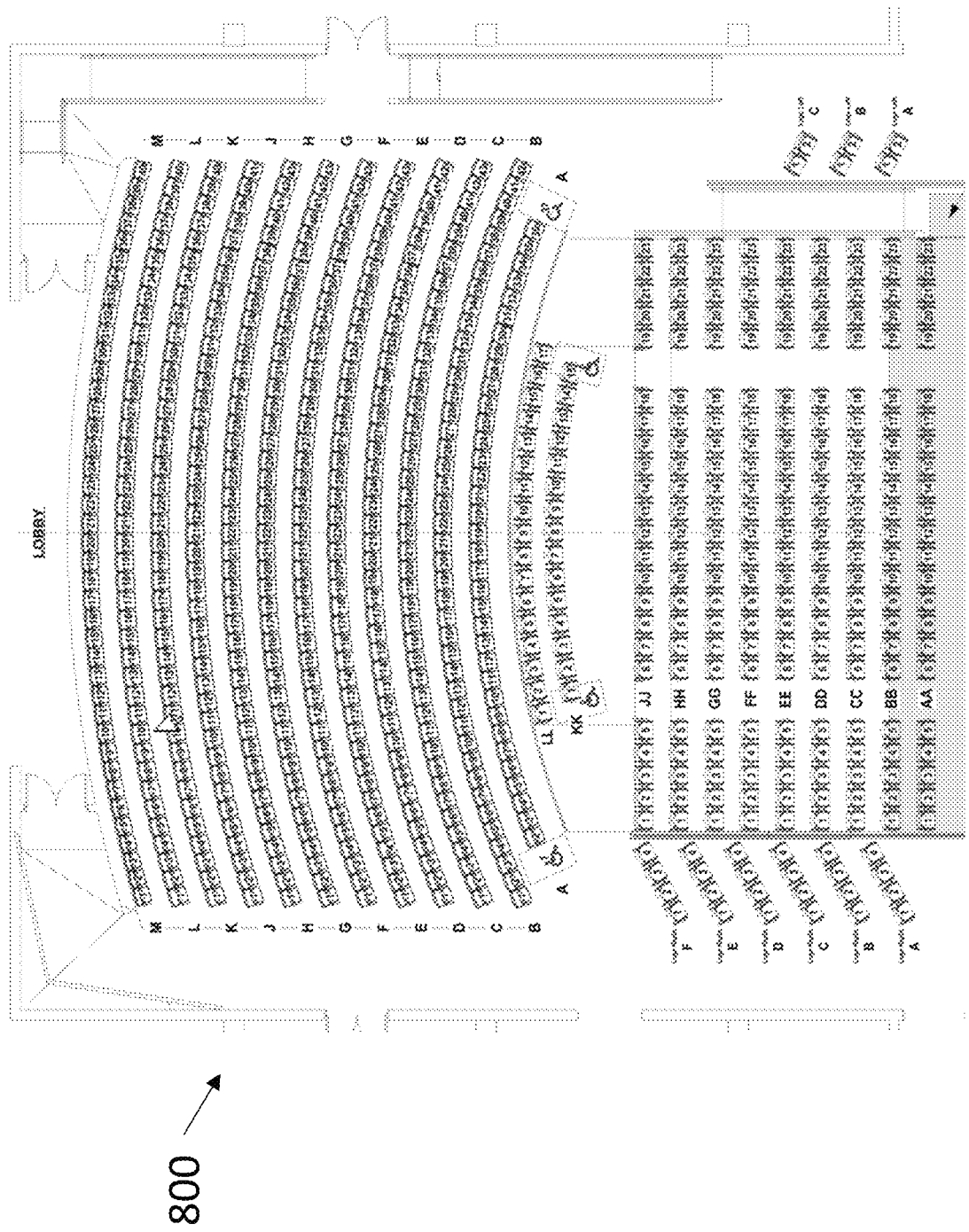
Figure 8B:
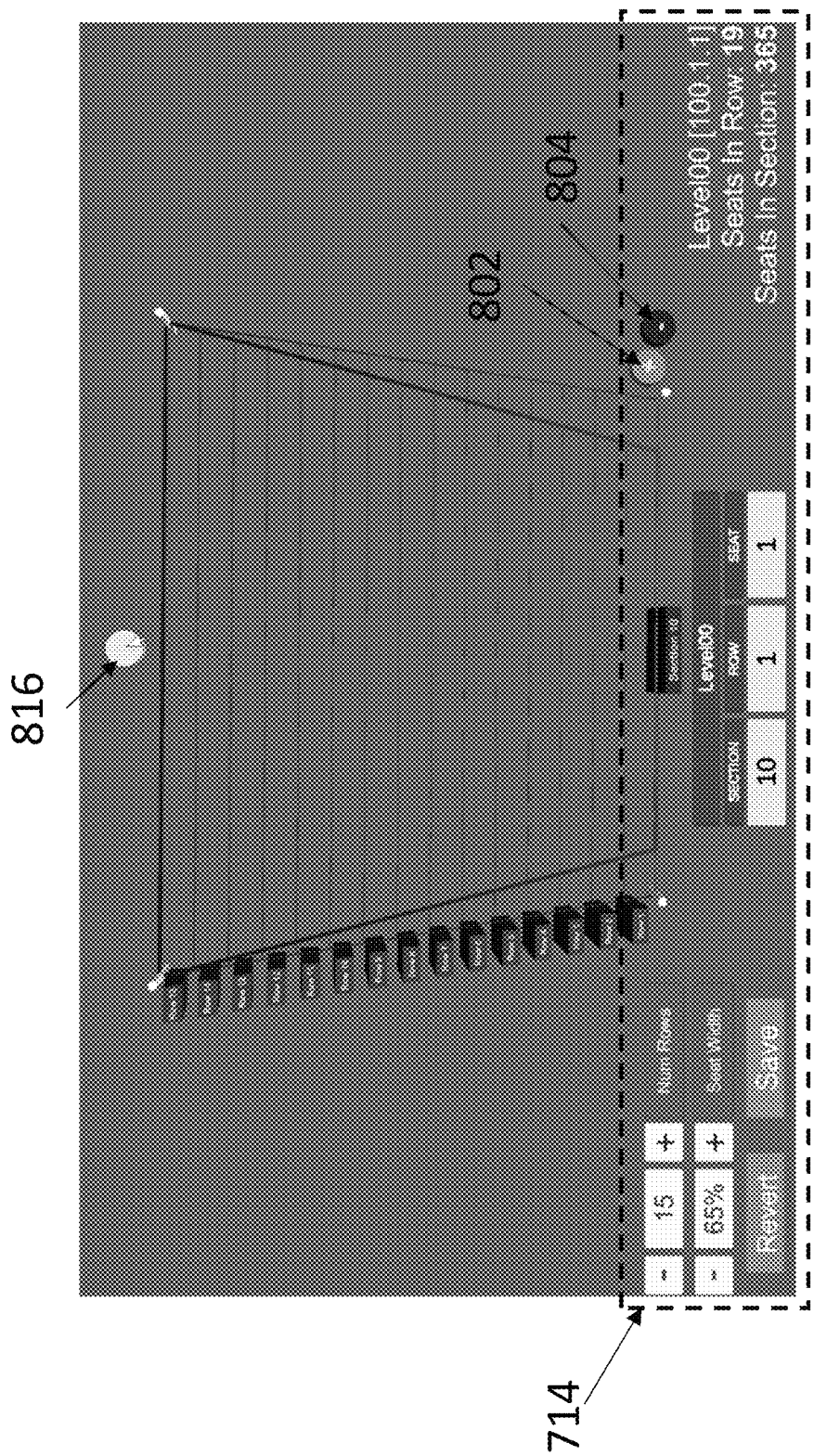
Figure 8C:
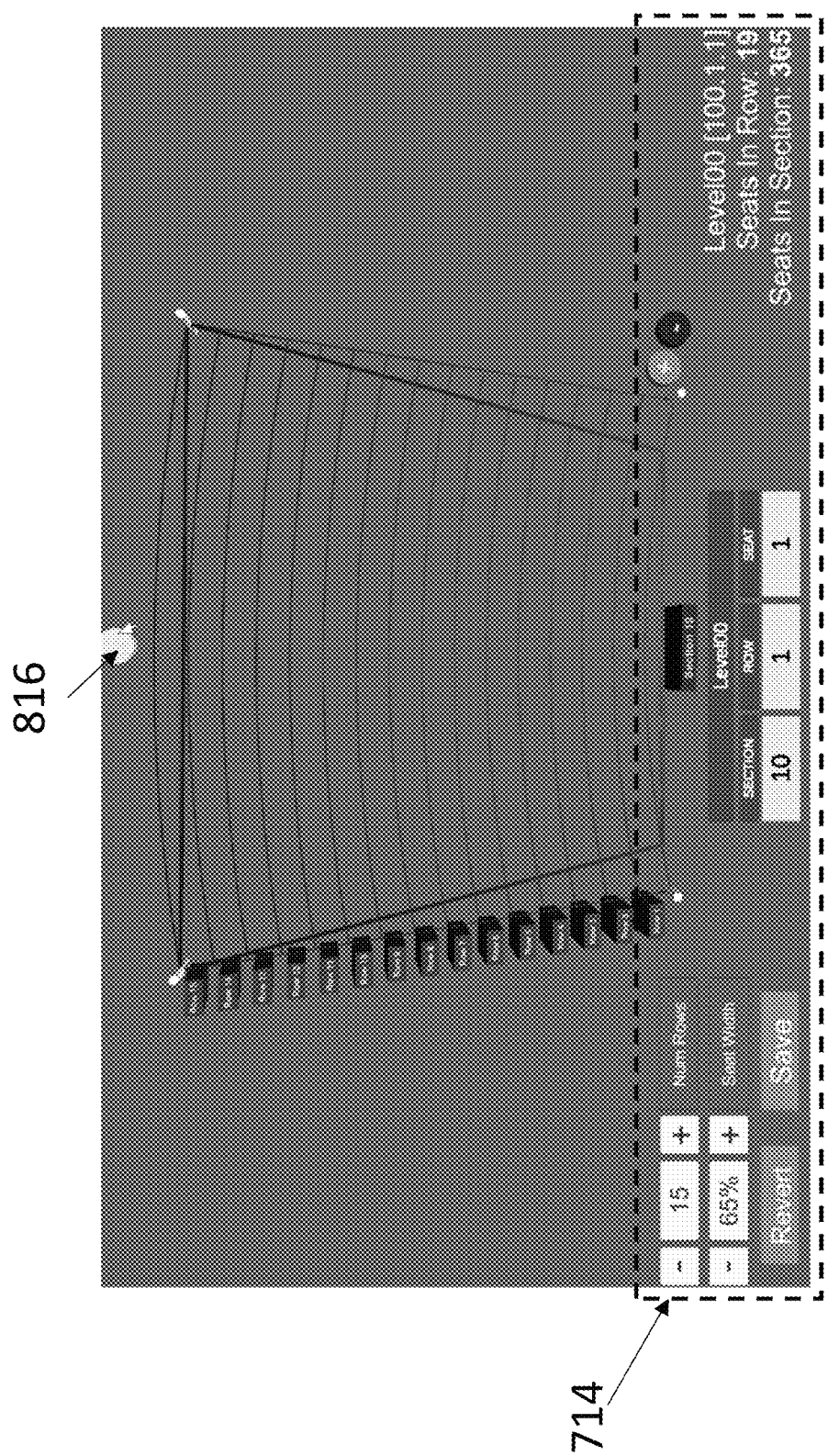
Figure 8D:
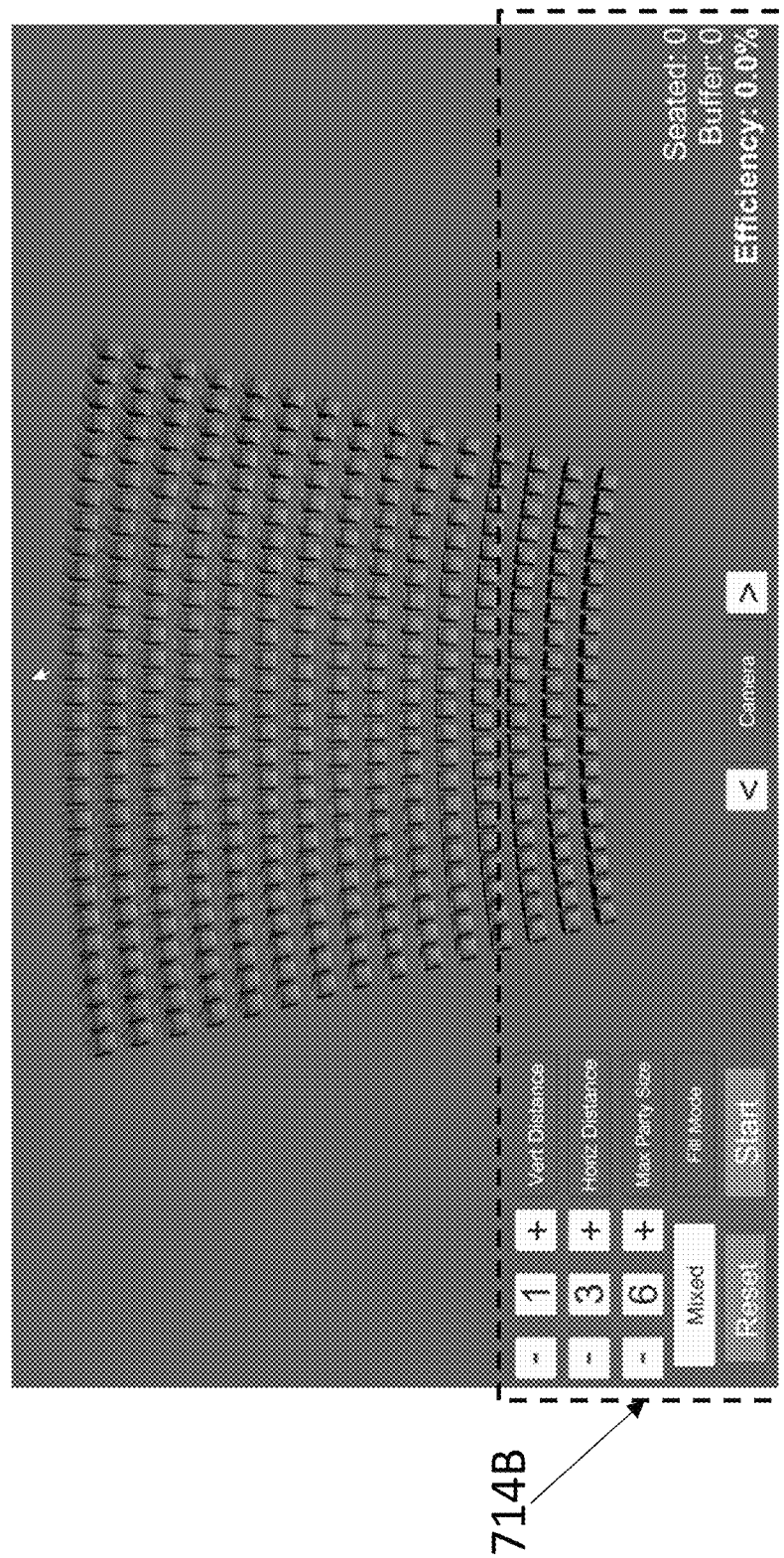
Figure 9A:
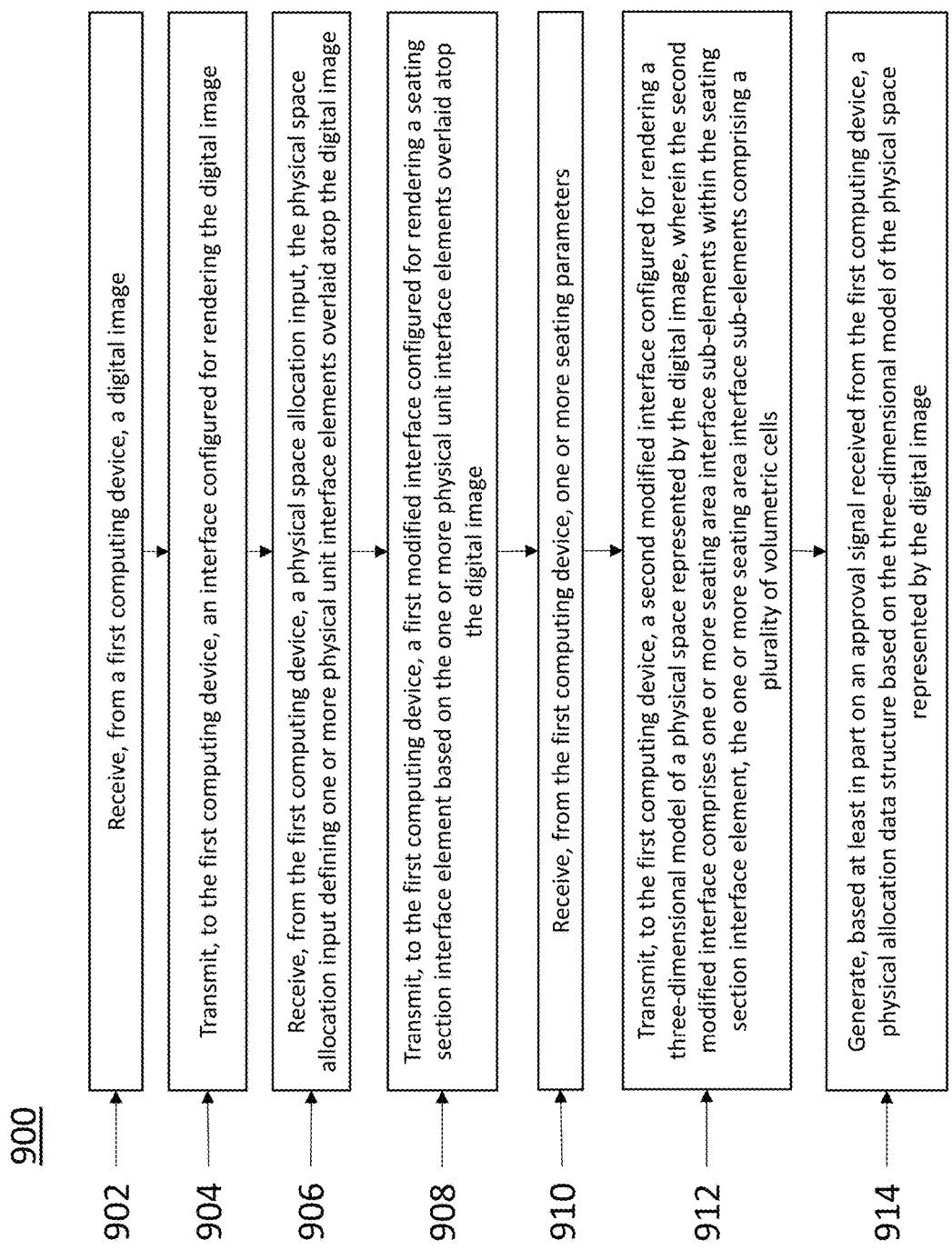
Figure 10A:
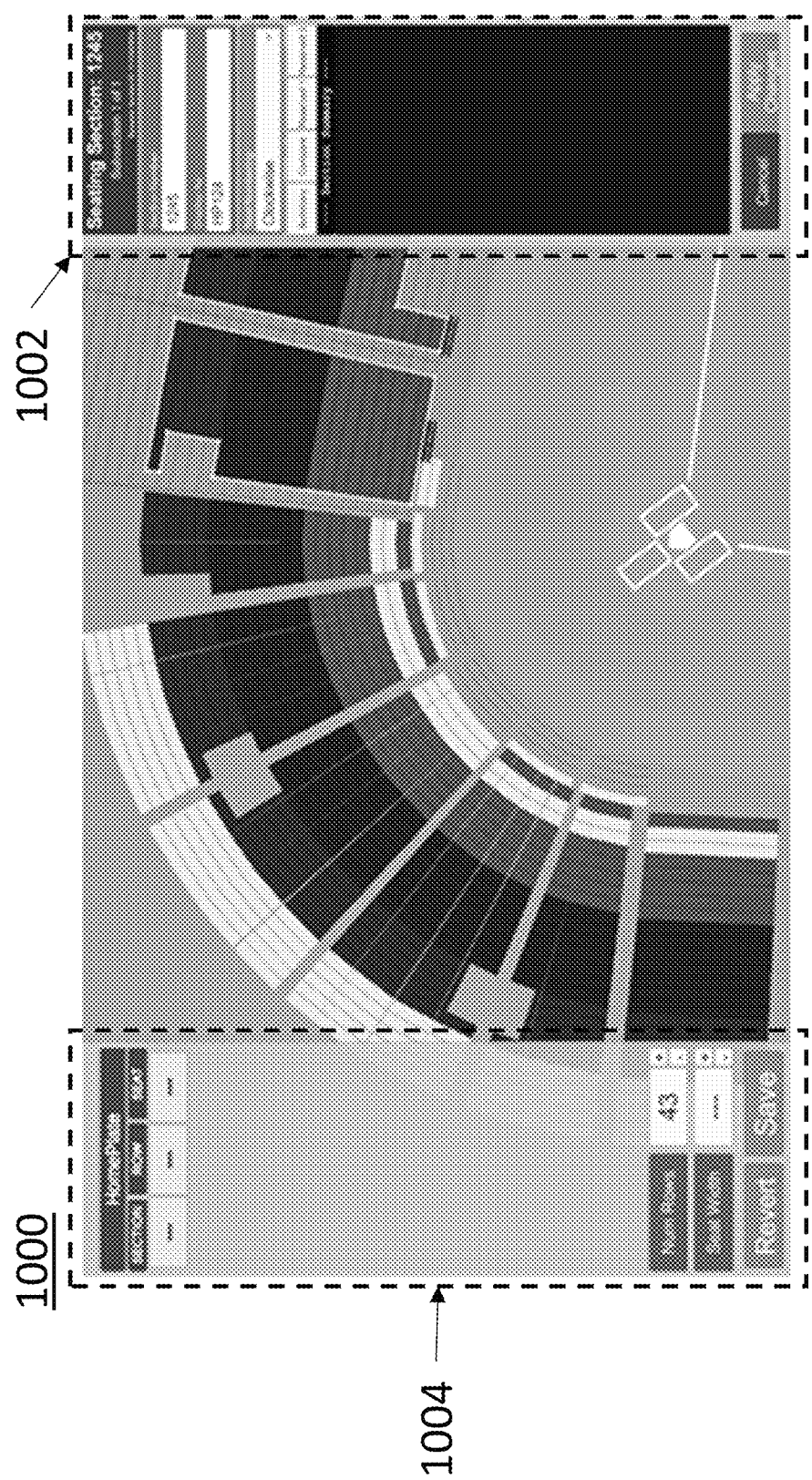
Figure 10B:
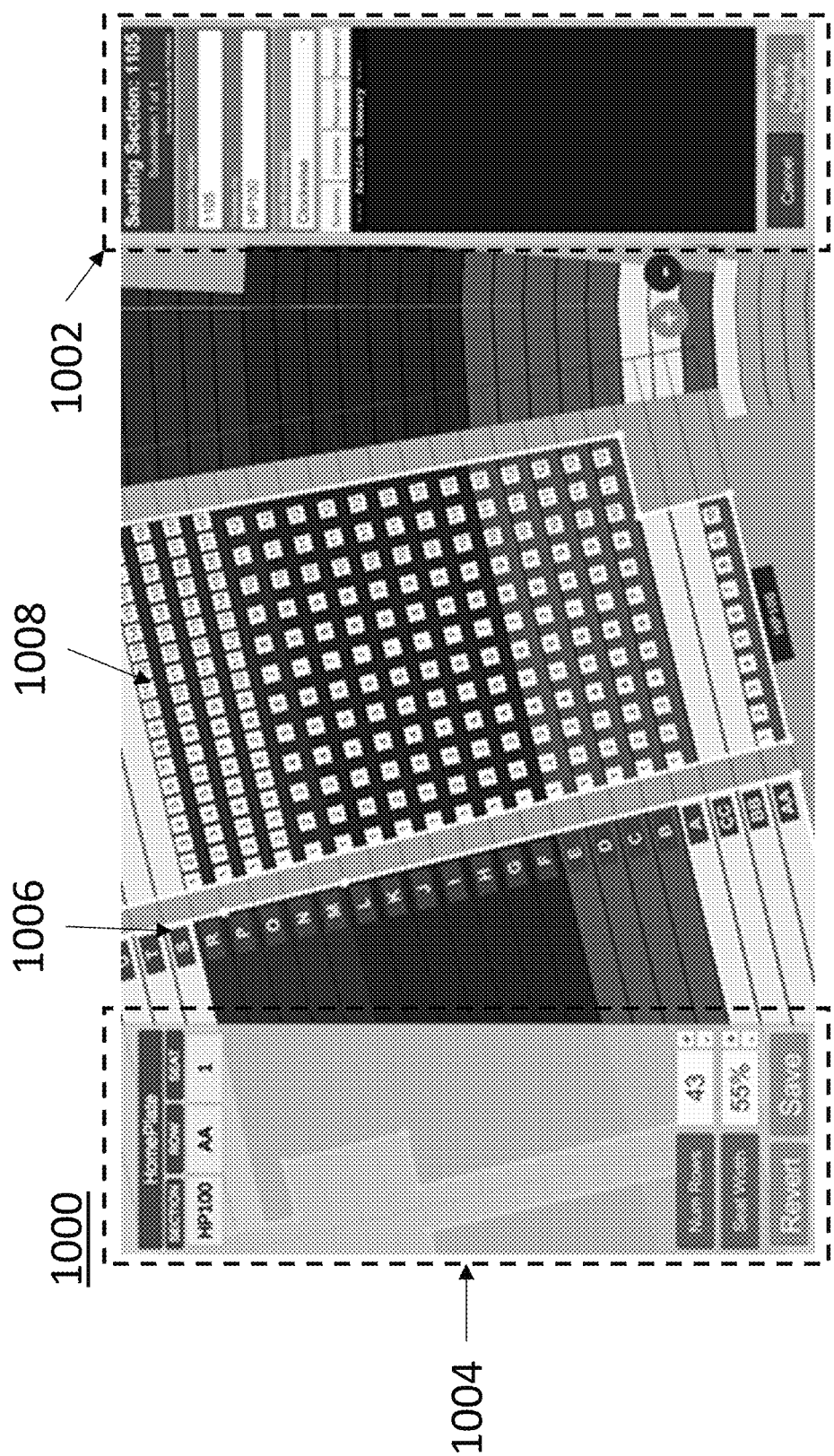
Figure 10C:
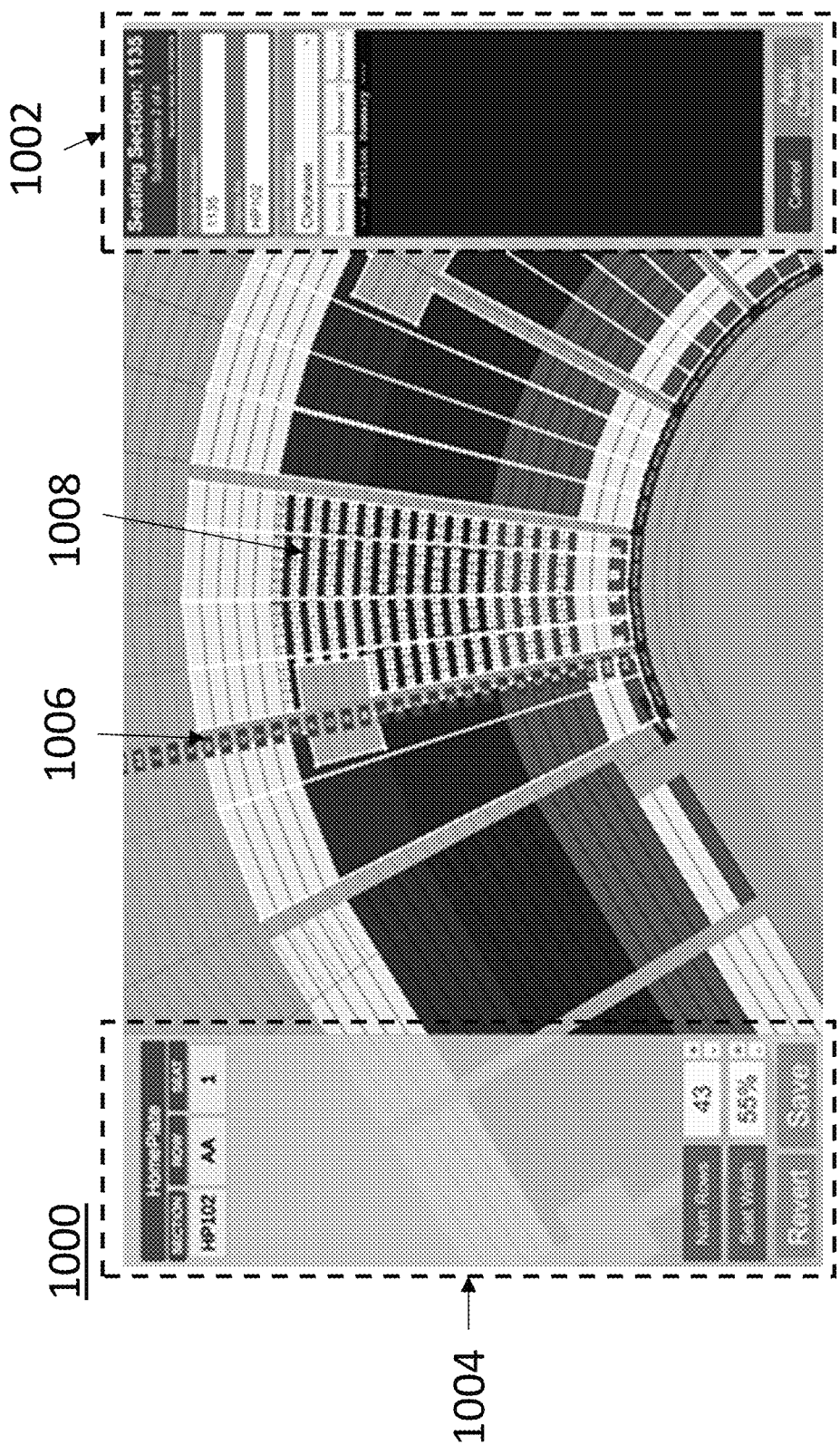

Having thus described the disclosure in general terms, reference will now be made to the accompanying drawings, which are not necessarily drawn to scale, and wherein:

FIG. 1 is a system architecture diagram of a physical unit allocation system configured to practice embodiments of the present disclosure;

FIG. 2 is an exemplary schematic diagram of a computing entity according to one embodiment of the present disclosure;

FIG. 3A is an exemplary digital image that may be transmitted to and received by the interface of example embodiments;

FIG. 3B is another exemplary digital image that may be transmitted to and received by the interface of example embodiments;

FIG. 4A is an exemplary digital document that may be transmitted to and received by the interface of example embodiments;

FIG. 4B is another exemplary digital document that may be transmitted to and received by the interface of example embodiments FIG. 5 is an exemplary physical space comprising a plurality of physical units to be generated into an electronic seating chart, for use with embodiments of the present disclosure;

FIG. 6 is an exemplary multi-dimensional matrix representing an exemplary physical space of FIG. 5 comprising a plurality of physical units for , for use with embodiments of the present disclosure;

FIG. 7A is another exemplary digital image that has been transmitted to and received by the interface, and rendered into a preliminary electronic seating chart that will be further transformed with a series of exemplary operations associ-
ated with electronic seating chart generation, for use with embodiments of the present disclosure;

FIG. 7B is an exemplary interface for rendering graphical representation of a physical space comprising a plurality of physical units to be generated into an electronic seating chart, for use with embodiments of the present disclosure;

FIGS. 7C, 7D, 7E, 7F, 7G illustrate a series of exemplary operations associated with electronic seating chart generation, for use with embodiments of the present disclosure;

FIG. 8A is another exemplary digital image that may be transmitted to and received by the interface and processed with a series of exemplary operations associated with electronic seating chart generation, for use with embodiments of the present disclosure;

FIG. 8B is an exemplary interface for rendering graphical representation of a physical space comprising a plurality of physical units to be generated into an electronic seating chart, for use with embodiments of the present disclosure;

FIGS. 8C, 8D illustrate a series of exemplary operations associated with electronic seating chart generation, for use with embodiments of the present disclosure;

FIGS. 9A and 9B illustrate exemplary operations associated with the generation of an electronic seating chart associated with a physical space, for use with embodiments of the present disclosure; and FIGS. 10A, 10B, and 10C illustrate multiple views of an exemplary electronic seating chart, for use with embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Embodiments of the present disclosure provide an interface to automatically generate interactive electronic seating charts for a physical space from a digital image. The interface may be configured to receive a digital image, or the like, and, in response, process the image to render via a display of a computing device the interactive electronic seating chart. A programmable computer model may be automatically generated for reflecting physical features of the physical space. A digital image, and/or other digital documents, associated with a venue may be utilized to in accordance with some embodiments to generate physical units. Physical properties of the physical space may be inferred from, or explicitly given by, the digital image and other digital documents. From the provided data an electronic seating chart comprising a three-dimensional model of the physical space and physical units therein may be automatically generated. The automatically generated electronic seating chart may capture a plurality of seats and other features provided by at least the digital image.

Embodiments of the present disclosure provide an interactive tool set that may augment an interface to provide graphical elements to generate, modify, and/or transform an electronic seating chart. The interactive tool set may be configured to receive electronic interactions from a user, via at least the input circuitry of a computing device, to generate and render for display a new electronic seating chart. The interactive tool set may be configured to receive electronic interactions from a user, via at least the input circuitry of a computing device, to transform at least some renderable features of an existing electronic seating chart. The interactive tool set may be configured as part of a wider online system which allows for electronic seating charts to be remotely built, transformed, and shared by a plurality of users. In accordance with some embodiments, the interactive online tool set allows users from a plurality of organization to collaborate and share electronic seating charts and/or information associated therewith.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, and the like.

The term "interface" refers to a collection of graphical interface elements for rendering representations of a physical space. The representations of the physical space comprising a plurality of physical units and/or informational elements reflecting conditions associated with the plurality of physical units. For example, the interface may reflect a status of unavailable or available for each physical unit of the plurality of physical units represented by the interface. The interface may reflect a status of unavailable based on allocation for use by a physical being or unavailable based on allocation to remain unused by a physical being for those physical units associated with a status of unavailable. The interface may include, without limitation, elements for importing three-dimensional models reflecting physical units, elements for transforming the physical space or physical units, elements for traversing points throughout an electronic seating chart, the like, or combinations thereof.

The interface may be configured for rendering via a display device of a computing device. The interface may be configured in accordance with constraints associated with the display device of the computing device (e.g., a size of the display device, an operating system of the computing device, a resolution of the display device, and the like). In some embodiments, there may be a plurality of different interfaces associated with one or more features or collection of features described herein, for example, an electronic seating chart or an interactive tool set.

The term "physical space identifier" refers to one or more items of data by which a physical space (e.g., venue, hall, stadium, theatre, plane, train, bus, etc.) may be identified. For example, a physical space identifier may comprise ASCII text, a pointer, a memory address, and the like.

The term "interaction" refers to an identifiable, non-transitory occurrence that has technical significance for system hardware and/or software. An interaction may be user-generated, such as keystrokes or mouse movements, or system-generated, such as program loading and errors.

The term "graphical tool element" refers to a graphical element rendered via an interface that is associated with a characteristic of a physical unit (e.g., seating section, seating area, seat, row, etc.). For example, a corner of a seating section may be associated with a graphical tool element represented by a white cylindrical post icon. The graphical tool element represented by a white cylindrical post icon may receive a user input, such as a mouse click and drag input, from a computing device this input signal, for example, may cause the associated seating section to translate, expand, and/or contract. A graphical tool element may be tied to one or more characteristics of a physical unit, for example, a dimension, position, orientation, quantity, geometric feature (e.g., line straightness/curvature, etc.). In certain embodiments, graphical tool elements may be pinned to specific locations within images or other visual representations of data provided by users, thereby enabling generation of composite visual representations comprising both the images (or other visual representations) provided by users as well as one or more graphical tool elements. Such embodiments may facilitate the system generating an interactive visual overlay that may be usable for later analysis, such as asset allocation based on the locations of asset representations within the interactive visual overlay. Moreover, such embodiments may enable generation of entirely new visual representations, such as visual representations having an additional dimension (e.g., a three-dimensional visual representation generated based at least in part on a two-dimensional visual representation overlaid onto an image provided by a user) generated based at least in part on the interactive visual overlay.

The term "physical space" refers to a physical location at which an event may take place. A physical space may be associated with a venue, an arena, a stadium, a transport vehicle (e.g., plane, train, bus), and the like. A physical space may have a plurality of physical units within it that may be allocated for occupancy by a physical being during an event.

The term "physical unit" refers to a subsection of a physical space that can be occupied, or interacted with, by a physical being or that can be left unoccupied by physical beings during an event. Examples of physical units include seats, aisles, balconies, doorways, stairs, column, lighting fixture, or the like. A physical unit may be associated with one or more dimensions. The one or more dimensions may comprise one or more of a depth, a width, a height, or a space radius. A space radius may be a cushion of free space surrounding a physical unit.

The term "fixed arrangement" refers to an alterable or unalterable arrangement of physical units within a physical space. For example, physical units may be arranged according to a matrix of rows and columns or a semicircle, or other arrangement convenient for a particular event taking place at the physical space.

The term "electronic seating chart" refers to a computer generated model of the seating and other physical units for a physical space. It includes the seating arrangement of the physical space grouped into rows and sections according to a numbering scheme. It also includes physical properties such as the type of seating, relative position and orientation of physical units, and physical dimensions of each physical unit.

The terms "digital image," "seating chart image," or similar terms refer to a two-dimensional image of a physical space that illustrates seating arrangements and/or seating sections. For example, a top-down illustration of the seats and the stage, screen, and/or field of a stadium. The digital image may be a diagram illustrated to represent the physical space or it may be a picture of the actual physical space. The digital image may comprise a plurality of the aforementioned image types.

The terms "seating manifest" or "manifest" refer to a digital document that contains a listing of all venue seats with each seat being identified by a numbering scheme based on the seat's section, row and seat number (or position within the row), and may be cross-referenced to additional details for individual seats or groups of seats. In embodiments, the seating manifest is one or more of a database table, spreadsheet, comma-separated values file, or the like. In embodiments, a seating manifest comprises, for one or more seats, a section identifier (e.g., one or more of a number, letter, color, or name reflecting the seating section in which the seat is located), a row identifier (e.g., one or more of a number, letter, color, or name of a seating row in which the seat is located), and a seat identifier (e.g., one or more of a number, letter, color, or name reflecting an individual seat at a venue). The seating data contained in a seating manifest may be sorted into spread sheet columns so that each column contains details for a particular seat within the venue, while each row of the manifest contains the pertinent details for a respective seat. In embodiments, a seating manifest may further include, without limitation, one or more of prices, price tiers, seating types (e.g., wheelchair seats, companion seats, etc.), season ticket holder data, sales data (e.g., sold/unsold status, historical sold/unsold status, historical prices, etc.), custom data pertinent to particular venues (e.g., a splash zone identifier for marine life parks, etc.), customer account metrics, priority preference scores, or the like.

The term "seating parameters" refers to physical characteristics related to the seating arrangements of seating sections. Examples of seating parameters includes a number of rows, a number of seats, an occupancy limit, a row depth, an angle between seating sections, a seat width, a seat depth, a seat height, and a type of seating. The type of seating may include bench seating, luxury seating, handicap seating, standing-room only sections, or the like and may be associated with particular prices or areas of the physical space.

The term "seating section" refers to a subdivision of the physical space that is identified by way of a seating chart image. The seating section may include seating areas, standing areas, rows, aisles, stairs, or the like. The seating section is defined by at least four joints and four corners. In some embodiments the seating section may include one or more curved joints.

The term "row quantity" refers to the number of seating rows within a seating section and/or seating area.

The term "row depth" refers to a physical dimension of a seating row measured, in the forward facing direction, from the rear most surface of a seat within the seating row to another rear most surface of a seat in the nearest frontward adjacent seating row. In an instance the seating row does not have another row in front of it the row depth is measured by adding the depth of a seat of the row to the width of a walkway in front of the row of seats. In some embodiments, the row depth measurement may be used to generate a relative unit of scale for the electronic seating chart or a three-dimensional model thereof. The relative unit of scale based on the row depth may be referred to as a row depth unit (RDU) and is used to define all other dimensional measurements within the electronic seating chart or a three-dimensional model thereof. For example, a height measurement for a door way may be defined as 3 times the RDU.

The term "seat width" refers to a physical dimension of a seat measured from the left most surface of the seat to the right most surface of the seat. In an instance the seat is a bench seat the individual seat width may be defined by visual markers placed on the bench (e.g., lines running from the front to the rear of the bench seat may be placed 20 inches apart down the length of the bench seat to delineate individual seat widths along the bench seat.)

The terms "row height" and "riser height" refer to the physical dimension of the height between successive rows. The row height can be given in standard absolute units of measure such as inches, or in relative measure using RDUs.

The term "joint angle" refers to an angle formed by two adjacent seating section joints of two separate seating sections.

The terms "section joint" refers to an edge of a seating section that runs between two adjacent corners of the seating section. A section joint between two adjacent corners of a seating section may include a straight line, a single arced curve, or a spline comprising multiple curves. The magnitude of a given curve of a section joint may be configured to be relative to one or more control points associated with the section joint.

The term "section corner" refers to a single point of a seating section where two section joints converge. The section corner can also be a control point that can receive an interaction in order to translate, scale, increase a length or width, or decrease a length or width of a seating section. In some embodiments, adjacent seating sections may share one or more section corners, for example, the bottom right section corner of a first seating section may also be the bottom left section corner of a second seating section.

The term "location interaction" refers to an interaction that defines the location of a physical unit, seating area, or seating section within the electronic seating chart or a three-dimensional model thereof. The location interaction may include an interaction that translates a physical unit, physical feature, seating area, seating section, or the like within the electronic seating chart or a three-dimensional model thereof from a first location to a second location.

The term "seating area" refers to sub-section of a seating section that is configured to include one or more seats. The seating area includes four area edges and four area vertices when initially added to an electronic seating chart or a three-dimensional model thereof. By way of an interaction the seating area may have area edges and area vertices added or deleted to form a plurality of polygon shapes.

The term "seating area interaction" refers to an interaction that adds, deletes, or moves an area edge and/or an area vertex associated with a seating area.

The term "area edge" refers to an edge of a seating area that runs between two adjacent vertices of the seating area. An area edge between two adjacent vertices of a seating area may include a straight line, a single arced curve, or a spline comprising multiple curves. The magnitude of a given curve of an area edge may be configured to be relative to one or more control points associated with the area edge or may be configured to align with a section joint of an associated seating section. In some embodiments, an area edge may be configured to align with a seating row of a seating section.

The term "area vertex" refers to a single point of a seating area where two area edges converge. The area vertex can also be a control point that can receive an interaction in order to translate, scale, increase a length or width, or decrease a length or width of a seating area. In some embodiments, adjacent seating areas may share one or more area vertices, for example, the bottom right area vertex of a first seating area may also be the bottom left area vertex of a second seating area. In some embodiments, an area vertex and a section corner may be a single control point.

The term "color-coded definition" refers to a data structure that associates a plurality of colors or infill patterns of a seating chart with a plurality of values. The plurality of values may include seating types, seating prices, an elevation height, or the like. For example, a seating section on a seating chart image may be colored red to indicated that individual seats in this section cost $50 each. Additionally, another section, for example, may be blue to indicate that the individual seats in this section are wheelchair accessible. The color-coded definitions can generate an interaction that, for example, automatically associates each seat of a seating chart with a price value.

The term "physical feature" refers to a physical object within a physical space that can be represented by a volumetric cell within a three-dimensional model. The physical feature can represent physical units or structural features of the physical space. For example, a physical object may be one or more volumetric cells within a three-dimensional model that represent a seat, a structural support (e.g., a column or pillar of a building), a door within a doorway, railing along a balcony, a section of floor, or the like. Additionally, a physical feature may include rendered objects within the three-dimensional space that are used for manipulating the computer generated model of the physical space (e.g., a seating section joint, a control point, etc.).

The term "control point" refers to a physical features rendered within a three-dimensional space used to receive interactions to manipulate the computer generated model of the physical space.

The term "physical space allocation input" refers to one or more items of data received from a computing device representing a request for physical units of a physical space. The allocation request may comprise a physical unit quantity (e.g., a number of desired seats), a physical unit arrangement type, and a location relative to a digital image.

The term "available physical unit" refers to a physical unit of a physical space that has not yet been reserved for either physical use or to remain empty or unoccupied for a given event.

The term "unavailable physical unit" refers to a physical unit of a physical space that has been reserved for either physical use or to remain empty or unoccupied for a given event.

The term "physical use" or "occupancy" refers to use by a physical being (e.g., a human being) such that the physical being may occupy the physical unit of the physical space for a duration of a given event.

The terms "unused," "empty," or "unoccupied" refer to a restriction placed on a physical unit of a physical space such that the physical unit must remain unused to provide a safe space surrounding other occupied physical units in its proximity and according to a physical unit allocation regulation.

The term "event identifier" refers to one or more items of data by which an event may be identified. Examples of events include live or pre-recorded sporting events, live or pre-recorded performances, air flights, bus trips or train rides. An event identifier may be associated with an event data structure. An event data structure may comprise a plurality of data records each comprising items of data associated with an event identifier. Items of data associated with the event identifier may comprise a date, time, GPS coordinates, event participants, and the like. The event data structure may comprise an event configuration.

The term "physical unit arrangement type" refers to a requested arrangement of reserved physical units. The physical unit arrangement type may be one of straight line, curved line, or geometric cluster (e.g., circular, etc.).

The term "machine learning model" refers to a machine learning task. A machine learning model comprises a title and encompasses one or more target variables.

The term "target variable" refers to a value that a machine learning model is designed to predict. In the present embodiments, historical data is used to train a machine learning model (e.g., the event optimization model) to predict (e.g., score) the target variable (e.g., the physical unit score). Historical observations of the target variable are used for such training.

The term "physical unit score" refers to a value representing a desirability or viability of a particular physical unit for selection for allocation in response to a given allocation request. The physical unit score is generated based on a physical unit quantity and physical unit arrangement type of an allocation request. The event optimization model is trained to adjust (increase or decrease) a physical unit score for each available physical unit based on a desired physical unit allocation measure.

Thus, the use of any such terms, as defined herein, should not be taken to limit the spirit and scope of embodiments of the present disclosure.

Example System Architecture

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a physical unit allocation system 103 via a communications network 102 using client devices 101A-101N. The physical unit allocation system 103 may comprise a physical unit allocation server 104 in communication with at least one repository 105 (e.g., physical unit allocation system 104 may comprise multiple repositories including a physical unit allocation repository and a physical space repository; alternatively repository 105 may comprise both a physical unit allocation repository and a physical space repository). It will be appreciated that, while references may be made herein to a physical space repository 105, repository 105 is not limited to such information.

Communications network 102 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 102 may include a cellular telephone, an 802.11, 802.16, 802.20, and/or WiMax network. Further, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the physical unit allocation system. In some embodiments, the protocol is a custom protocol of JSON objects sent via a Websocket channel. In some embodiments, the protocol is JSON over RPC, JSON over REST/HTTP, and the like.

The physical unit allocation server 104 may be embodied as a computer or computers. The physical unit allocation server 104 may provide for receiving of electronic data from various sources, including but not necessarily limited to the client devices 101A-101N.

The repository 105 may be embodied as a data storage device such as a Network Attached Storage (NAS) device or devices, or as a separate database server or servers. The repository 105 includes information accessed and stored by the physical unit allocation server 104 to facilitate the operations of the physical unit allocation system 105. For example, the repository 105 may include, without limitation, a plurality of physical space identifiers, a plurality of physical unit allocation regulations associated with physical space identifiers, available and unavailable physical units for allocation associated with physical space identifiers, live event data structures, and the like. Further, the repository 105 may include, without limitation, one or more of an electronic seating chart, a digital image, a digital document (e.g., a spreadsheet, webpage, text document, pricing tiers spreadsheet, seating manifest, etc.), a computer aided design application model, referential structural data, or the like.

The client devices 101A-101N may be a computing device as defined above. Electronic data received by the physical unit allocation server 104 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the physical unit allocation system 103. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the physical unit allocation system 103 via a web browser. As yet another example, the client device 101A-101N may include various hardware or firmware designed to interface with the physical unit allocation system 103.

Example Apparatus for Implementing Embodiments of the Present Disclosure

The physical unit allocation server 104 may be embodied by one or more computing systems, such as apparatus 200 shown in FIG. 2. The apparatus 200 may include a processor 202, a memory 201, input/output circuitry 203, communications circuitry 205, physical space/unit allocation repository 105 and physical unit allocation circuitry 204. The apparatus 200 may be configured to execute the operations described herein. Although the components are described with respect to functional limitations, it should be understood that the particular implementations necessarily include the use of particular hardware and software. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The physical unit allocation circuitry 204 includes hardware configured to support a physical unit allocation system. The physical unit allocation circuitry 204 may utilize processing circuitry, such as the processor 202, to perform these actions. The physical unit allocation circuitry 204 may send and/or receive data from physical space/unit allocation repository 105. It should also be appreciated that, in some embodiments, the physical unit allocation circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for the Generation of an Electronic Seating Chart

Embodiments of the present disclosure provide for the receipt of a digital image, digital document, the like, or combinations thereof and from the information included therein may at least partially automate the generation of an electronic seating chart. Upon receipt of the digital image, the digital image may be rendered within a three-dimensional space along with an interface configured to further receive input signals and output renderable information configured to be rendered via a display device. The three-dimensional space may be automatically filled with at least some of physical units associated with a physical space represented by the digital image. For example, a combination of physical units may be generated based on the information received via the digital image. The combination of physical units may reflect a football stadium complete with seating sections, walkways, railing, walls, flooring, playing field, sideline seating, the like, or combinations thereof. Electronic interactions associated with the combination of physical units may be received via the interface to manipulate the characteristics of one or more physical units. For example, the digital image may not display individual seats, or arrangements of seats, and therefore a user may transmit one or more seating parameters, seating area interactions, or the like, via a computing device communicably connected to the interface, to further define a seating arrangement for one or more seating sections.

FIG. 3A is an exemplary digital image that may be transmitted to and received by the interface of example embodiments. Utilizing digital images depicting traditional seating charts, such as depicted in FIG. 3A, an electronic seating chart can be at least partially automatically generated. However, some digital images, such as depicted in FIG. 3A, lack particular parameters such as a dimensional reference (e.g., RDU, distance scale, etc.), a vertical height parameter, seating quantity, or seat arrangements. As shown by FIG. 3A all of these parameters are absent. In such embodiments, the interface may be configured to receive seating parameters from a user interface of one or more computing devices.

FIG. 3B is another exemplary digital image that may be transmitted to and received by the interface of example embodiments. As shown by FIG. 3B each section is depicted as a cluster of circular seating icons with at least a position and number. The seats of each section are aligned in rows labeled by a letter along at least one end of a respective row. It will be appreciated that the digital image of FIG. 3B is missing at least a dimensional reference (e.g., RDU, distance scale, etc.) which may be input via at least the interface in the form of a seating parameter. In some embodiments, the dimensional reference may be used to scale features of the digital image to more accurately represent a three-dimensional model of the physical space and physical units therein.

FIG. 4A is an exemplary digital document that may be transmitted to and received by the interface of example embodiments. For example, the interface may receive a digital image, such as in FIG. 3A, and then further receive or access a digital document that provides referential information for the color-coded seating sections of FIG. 3A. As depicted by FIG. 4A each particular seating section color is associated with a name of the seating section and at least a ticket price.

FIG. 4B is another exemplary digital document that may be transmitted to and received by the interface of example embodiments. For example, the interface may receive a digital image, such as in FIG. 3B, which is further configured with the digital document depicted by FIG. 4B. As shown, in FIG. 4B, each seat color is associated with a price detail, for example, Premium, Price Zone A, etc. The digital document also illustrates and labels the icon for a support pillar and wheelchair accessible seats. In some embodiments, another digital document, for example, a spreadsheet, may comprise prices associated with each Price Zone for one or more events by associating each price with both a price zone and an event identifier. In some embodiments, this additional information may be added to a generated electronic seating chart.

FIG. 5 is an exemplary physical space comprising a plurality of physical units for allocation, for use with embodiments of the present disclosure. FIG. 6 is an exemplary multi-dimensional matrix representing an exemplary physical space of FIG. 5 comprising a plurality of physical units for allocation, for use with embodiments of the present disclosure. In FIGS. 5 and 6, a physical space (e.g., a venue) comprises a plurality of physical units (e.g., seats) arranged in relation to one another according to a fixed arrangement. For example, the physical units (e.g., seats) are arranged among a plurality of rows (e.g., Row 1, Row 2, Row 3) with a front-most row (e.g., Row 1) arranged adjacent a front (e.g., Front) of the physical space and each row spanning from a first side (e.g., Left, or Aisle) to a second side (e.g., Right) of a section of the physical space. In FIG. 6, the physical space illustrated in FIG. 5 is represented as a two-dimensional matrix having a plurality of rows (e.g., Row 1, Row 2, Row 3) and a plurality of columns, where each physical unit (e.g., seat) is associated with a row-column pair. That is, a physical unit may be represented by a pair of identifiers comprising a first row identifier and a first column identifier. In some embodiments, each physical unit (e.g., seat) may be associated with one or more of a floor level, seating section, seating subsection (e.g., seating area), row, column, or seat identifier (e.g., symbol, color, number, letter, name, the like or combinations thereof).

FIG. 7A is another exemplary digital image that has been transmitted to and received by the interface, and rendered into a preliminary electronic seating chart that will be further transformed with a series of exemplary operations associated with electronic seating chart generation, for use with embodiments of the present disclosure. In some embodiments, a user associated with a computing device may identify the digital image by way of graphical elements of an interface to upload the digital image to a virtual physical space representative of a physical space. It will be appreciated that the uploaded digital image may function as a visual guide in accordance with example embodiments. As illustrated, exemplary digital image 700 of FIG. 7A comprises a two-dimensional top-down seating chart that has been imported into a virtual physical space to be further processed by operations associated with the present disclosure. Digital image 700 illustrates a traditional seating chart image with a plurality of seating sections each comprising a plurality of rows labeled A-V. The plurality of rows extend between each seating section with a joint angle between each seating section transitioning the alignment of the plurality of row between each section. As shown the plurality of rows remain parallel relative to each other within each respective seating section. Row labels 702 are configured on either end of each row and each seat is represented by a square with a number inside. The further front-left-most seat is reflected by seat icon 704, that depicts a square with the number two enclosed in the square. In accordance with the example digital image 700, seat icon 704 may be associated with a number scheme of row-seat identifiers without a seating section identifier because the rows are continuous throughout each section (e.g., each row spans all three sections). For example, the seat reflected by seat icon 704 may be identified as seat A-2.

FIG. 7B is an exemplary interface for rendering graphical representation of a physical space comprising a plurality of physical units to be generated into an electronic seating chart, for use with embodiments of the present disclosure. Embodiments of the present disclosure enable provision, via the user interface, of various metrics associated with a physical space, and generation of an interface for rendering a graphical representation of the physical space into an electronic seating chart based on the various metrics. Such a graphical representation may comprise the physical space without any physical units allocated (e.g., an empty seating chart). In alternative embodiments, the graphical representation may be dynamically updated as physical units are generated and allocated to locations within the electronic seating chart such that the physical space representation reflects some or all of its associated physical units. For example, some electronic seating charts may reflect only the seats of a physical space while excluding representations of other physical features such as structural columns. The graphical elements of the exemplary interface of FIG. 7B may be automatically generated in response to receipt of one or more digital images, and/or digital documents. For example, the graphical elements of exemplary interface of FIG. 7B are automatically configured based on a user, via the interface, causing upload of exemplary digital image 700 of FIG. 7A.

In FIG. 7B, the exemplary interface comprises graphical representation of a plurality of seating sections (e.g., seating sections 706, 708, 710), a plurality of seating areas (e.g., seating areas 706A, 708A, 710A), and a plurality of rows 712, part of a physical space (e.g., a venue). The exemplary interface may further comprise a selection pane 714 whereby selections including physical dimensions (e.g., distances between physical units, seat dimensions, etc.) of the electronic seating chart may be provided, as well as physical unit quantities (e.g., a number of rows, seats, seating sections, seating areas, etc.) and a physical unit arrangement type (e.g., straight, curved, etc.). In some embodiments, physical dimensions may be entered by a user via a computing device into the interface as a discrete number (e.g., 10 meters, 3 inches, etc.) or a relative value (e.g., 30% of a single seat width, height, or depth, etc.).

In FIG. 7B, the exemplary interface may further comprise graphical tool elements (e.g., graphical tool elements 716)

within the virtual physical space associated with one or more generated physical units (e.g., a seating section, etc.). The graphical tool elements 716 may be configured to receive an interaction, such as from a user via a computing device, to transform, modify, add, or remove the one or more physical units. In some embodiments, one or more joint angles (e.g., joint angles 718) may be generated and rendered between seating sections, such as between seating sections 706 and 708 or between seating sections 708 and 710.

As illustrated, by FIG. 7B, each exemplary seating section comprises a four-sided shape (e.g., four joints connected via four corners) divided into equally spaced rows and further encompassing a seating area. In some embodiments, the seating area of a seating section is equal to or smaller than its seating section. FIG. 7B further illustrates that each seating section is aligned with at least one adjacent seating section via at least one joint with a small angle formed thereby.

Figure 7C:
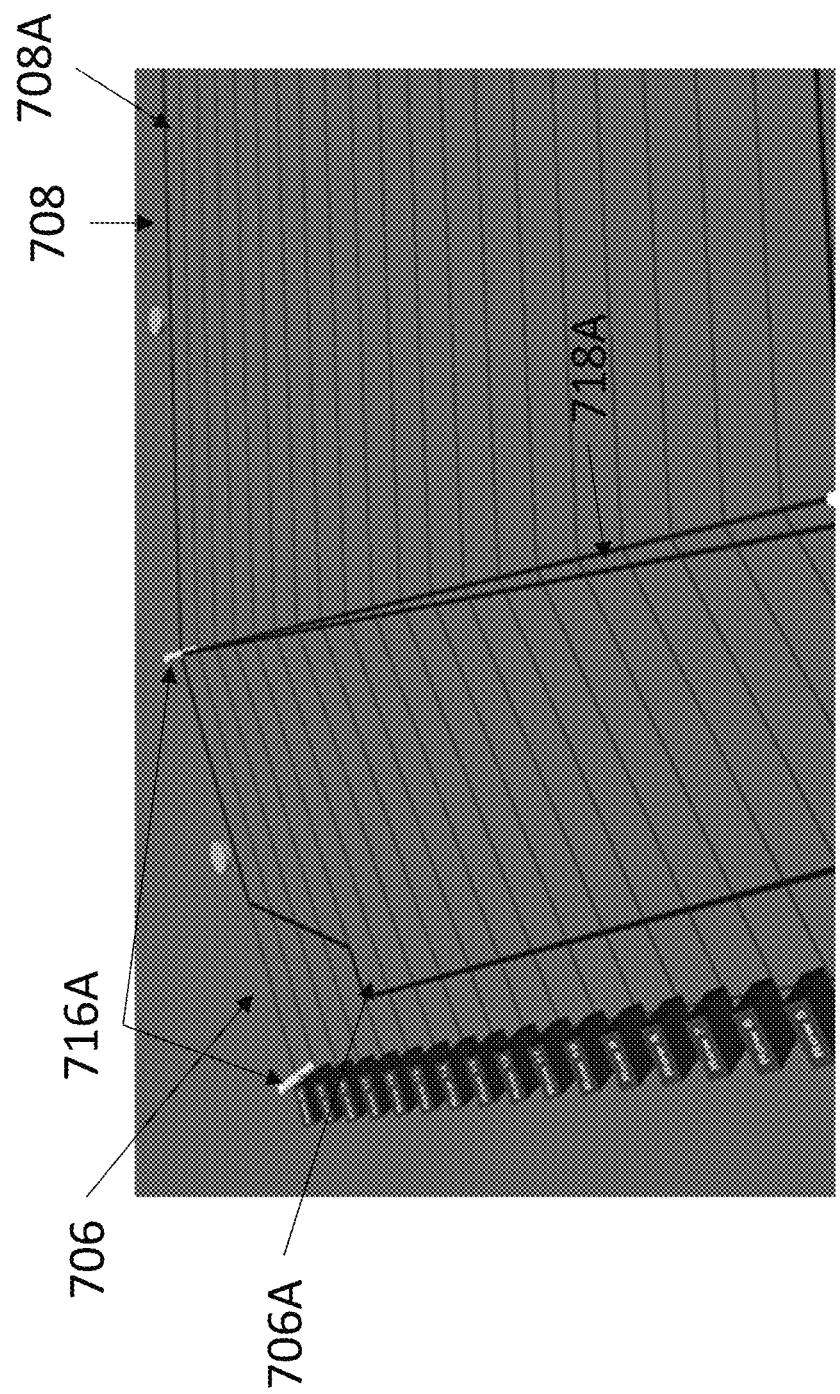

In FIG. 7C, after upload of the digital image and generation of a virtual physical space, one or more interactions may be received from a user via a computing device communicably connected to the exemplary interface. The interface may receive interactions from a user comprising one or more of a selection of a physical unit (e.g., selection of a seating section, selection of a graphical tool element, etc.), a physical unit quantity (e.g., a number of rows per one or more seating sections, etc.), an upload of one or more digital images or digital documents, the like or combinations thereof. For example, a user, via the interface, may add a new row to the plurality of seating sections and/or add a new seating section.

As illustrated by FIG. 7C, seating section 706 and 708 are associated with one or more of graphical tool elements 716A. The graphical tool elements 716A represented by a white cylindrical post icon reflect the corners of each seating section. In some embodiments, two seating sections may share a one or more corners. In some embodiments, adding additional sections will add one or more corner icons. The graphical tool elements 716A may receive a user input, such as a mouse click and drag input, to specify a location of the corner within the electronic seating chart. Dragging each of graphical tool elements 716A may cause the electronic seating chart to be at least partially re-generated. For example dragging the element of graphical tool elements 716A associated with the top left most corner of seating section 706 further up and to the left may cause seating section 706 to expand in size and dynamically increase the total seating capacity. In response, to the expansion of seating section 706, the electronic seating chart may be dynamically re-generated to comprise additional rows. In embodiments, graphical tool elements 716A, or the like (e.g., graphical element of selection pane 714, etc.), may receive a user input, such as a right mouse click or double click input, to deactivate (e.g., prevent, turn off, etc.) the dynamic increase of the total seating capacity and/or the dynamic re-generation within an expanded seating section (e.g., seating section 706, etc.). In such embodiments, seating section 706 may receive one or more user interaction signals (e.g., right click on the seating section to access a seating parameter input menu specific to the selected seating section, etc.) to adjust the total seating capacity for the section (e.g., the number, length, depth, and/or positions of rows, seats, etc.).

In some embodiments, the particular graphical tool elements may be associated with features different from other similar graphical tool elements. For example, the bottom left most graphical tool element representing the bottom left most corner of a seating section may be configured to, upon receipt of a user input (e.g., dragging, etc.), translate an associated seating section and any other physical units associated therewith (e.g., seating areas, rows, or other seating sections). Additionally, or alternatively, the top left most graphical tool element representing the top left most corner of a seating section may be configured to, upon receipt of a user input (e.g., dragging, etc.), scale an associated seating section and any other physical units associated therewith (e.g., seating areas, rows, or other seating sections). In some embodiments, graphical tool elements representing corners of a seating section may be dragged freely by a user input to visually align with the corners of an underlying digital image. In some embodiments, dragging a graphical tool element may also change the joint angle between seating sections and the electronic seating chart may dynamically regenerate the seating sections, in response. For example, changes to a joint angle (e.g., 718A) may reduce the number of seats in a row for a particular seating section. In some embodiments, a user may transform, via interactions with the interface, seating sections, or other physical units, of the electronic seating chart from left most to right most physical unit (e.g., clockwise) to align physical units with an underlying digital image without the electronic seating chart being regenerated with respect to previously aligned physical units or features thereof.

In some embodiments, a user may indicate, via the interface, a relative unit of scale which may be a dimension associated with a physical unit. For example, the depth dimension for a row may be utilized as a relative scale unit, e.g., Row Depth Unit (RDU), against which all other dimensions are measured. The depth of a single row may be generated automatically by dynamically measuring a distance between two points of a digital image. For example, during the upload of a digital image the distance between a front most edge of a seat icon may be measured to a front most edge of a seat in a direct adjacent row and this may automatically be assigned as the RDU value for the electronic seating chart upon generation. In some embodiments, the digital image may explicitly provide a scale bar with a relative measurable length, numerical value, and unit (e.g., feet, meters, inches, etc.) which may be recognized and assigned as the RDU during upload of a the digital image by a machine learning algorithm. In some embodiments, the user, via the interface, may provide interactions to define an RDU (e.g., typing a numerical value into an element provided by the interface). In some embodiments, the user, via the interface, may provide interactions to define individual dimensions for one or more physical units without need for reference to the RDU. In some embodiments, the user may upload via the interface one or more computer aided design models for physical units and these units may comprise one or more pre-defined dimensions which may be transformed by the user via interface interactions. In some embodiments, the height of a riser, the riser being the vertical step from one landing (or row) to the next, may be utilized to define the RDU.

In FIG. 7D, after having received one or more user interface interaction signals, received from a requesting computing device, example embodiments may further provision the dynamic generation of a seating area rendered with seat icons (e.g., cubes, rendered models, etc.) aligned according to the rows of the seating section. The seating area and other physical units therein may be generated in response to a user interface interaction signal or an internal confirmation by the physical unit allocation system. For example, a user may cause, via an interaction with, for example, a graphical element of selection pane 714, the generation of one or more seating areas. In some embodiments, a user may cause, via an interaction with, for example, a graphical element of selection pane 714, the interface to revert back to a previous state (e.g., as shown in FIG. 7A or 7B).

In embodiments, a user via the interface (e.g., graphical element selection pane 714, etc.) can deactivate (e.g., prevent, turn off, etc.) the dynamic generation of the seating area and/or the dynamic generation of the individual seat icons. In such embodiments, a user, via the interface (e.g., graphical element selection pane 714, etc.), can visually construct the sections and rows of the venue by defining the underlying segments of flooring and the joint angles at which the segments meet, specifying the maximum number of rows the comprise the segments, defining the boundaries of the seating sections on the segments and by naming the seating sections and rows using the same naming scheme as the venue uses in its seating manifest file(s), but without automatically generating the individual seats.

For example, the dynamic generation of a seating area with rows may occur and then a user may choose (e.g., by interacting with a turn-off auto-fill graphical element (not shown) in selection pane 714) to manipulate the seating arrangement. Following the construction and naming of the sections and rows, the user may upload, via the interface, a seating manifest file (e.g., a comma-separated file, etc.) that lists all the seats in the venue and numbers and identifies them by the section and row they belong to (as well as possibly other attributes of the seat such as its size, color, type, etc.). The user will also specify how the seats will be numbered within the section, for example if the numbering will be clockwise (left-to-right) or counter-clockwise (right-to-left), or if the numbering is consecutive or if it is only evens or only odds, and what the starting seat number for each row. The electronic seating chart will then parse the uploaded seating manifest file and for each seat in the manifest file, it will find the matching section and row number as specified by the user, and by using the numbering parameters configured by the user, be able to place the seat in its proper sequence within the row.

Furthermore, after processing the manifest file, the electronic seating chart will be able to identify any seats from the manifest which were not able to be placed (either because the seat's section and row was missing, or perhaps because a row as constructed was too short to accommodate all the seats) and other errors or anomalies (such as breaks in the numbering sequence) which can be noted or corrected by the user, and repeated until the manifest file loads without errors, resulting in an electronic seating chart that is in 1-to-1 correspondence with the given manifest file. In embodiments, the electronic seating chart will then further be able to generate or re-generate its own seating manifest files with extensive additional attributes, enhancements and measurements that are either computed by the electronic seating chart or as added by the user through the user interface.

It will be appreciated that, in various embodiments, an exemplary digital image that has been transformed into a preliminary electronic seating chart, according to embodiments here, can serve as a basis for further supplementing the preliminary electronic chart based on a manifest file. That is, in various embodiments, an exemplary digital image may be transformed, according to various methods described herein, into a preliminary electronic seating chart comprising various aspects of the physical space represented by the digital image, including sections and rows and possibly other aspects. In such embodiments, a manifest file (as described herein) may then be programmatically cross-referenced by apparatuses herein in order to further transform the preliminary electronic seating chart into an electronic seating chart having accurate seating areas based on the contents of the manifest file. Cross-referencing the manifest file (e.g., by parsing and/or traversing the manifest file and extracting data structures and associated values contained therein) eliminates the requirement for electronic interactions in order to assign seating areas or other seating aspects to the preliminary electronic seating chart. In embodiments, the exemplary digital image serves as a basis, as a preliminary electronic seating chart, for populating the electronic seating chart based on the contents of the manifest file, which may be accomplished by programmatically assigning the seats of the manifest to their respective sections and rows in the electronic seating chart and calculating the dimensions of the seating cells based on the total row length and the number of actual seats in the row. In the case where there is a gap or interruption in the continuity of a row and the row is subdivided into disjoint segments ("subrows"), then the row of sequenced seats from the manifest file can also be similarly divided into subsequences where the number of seats for each subsequence is derived from the proportion of the row length of each subrow segment to the total row length of the subrows. Computing resources are tremendously conserved because multiple iterations of adjusting each row or other physical space aspect (e.g., due to a lack of uniformity) can be avoided. Avoiding multiple iterations of adjusting physical space aspects eliminates unnecessary transmission of data over communication channels or networks, and eliminates processing power required for updating the graphical user interface. Human usability and efficiency (in addition to computing accuracy) are also tremendously improved as the direct use of the seating manifest eliminates the chance of miscalculation of the number of seats based on the seating parameters alone, greatly improves the programmatic detection of gross errors in the representation of the sections and rows, such as missing sections or rows that are too short, and reduces the time required on the part of the user for manual and iterative confirmation of accuracy of the resulting electronic seating chart.

As illustrated by FIG. 7D, seating areas 706A and 708B are rendered, via the interface, with a plurality of seat icons and are further associated with one or more graphical tool elements. The seating areas may comprise a plurality of vertices (e.g., graphical representations of corner points formed by the intersection of edges) and a plurality of edges (e.g., graphical representations of sides of a seating area). Seating areas (e.g., 706A) may be configured in a plurality of geometric shapes and sizes. By way of one or more user interface interaction signals, received from a requesting computing device, a user may transform, add, remove, scale, or otherwise modify one or more seating areas, or features thereof (e.g., seats, rows, dimensions of edges, etc.). For example, a user may transmit interaction signals via graphical tool elements 716B. The graphical tool elements 716B represented by a white cylindrical post icon reflect the vertices of each seating area. In some embodiments, two seating areas may share a one or more vertices. In some embodiments, adding additional seating areas will add one or more vertex icons. The graphical tool elements 716B may receive a user input, such as a mouse click and drag input, to specify a location of the vertex within the electronic seating chart. In some embodiments, the vertex, and/or associated edges may align with the rows of a seating section (e.g., the vertex icon, or edge icon, snap to the seating section row lines). Dragging each of graphical tool elements 716B may cause the electronic seating chart to be at least partially re-generated. For example dragging the element of graphical tool elements 716B associated with the top left most corner of seating area 706A further up and to the left may cause seating area 706A to expand in size and thereby automatically render additional seat icons to fill the increased seating area.

By way of one or more user interface interaction signals, received from a requesting computing device, a user may add additional seating area vertices to a particular seating area by, for example, clicking with a mouse, on an seating area edge where they want an additional seating area vertex to be rendered by the interface. Similarly, a user may remove or delete additional seating area vertices to a particular seating area by, for example, double clicking with a mouse, on an seating area edge where they want an additional seating area vertex to be rendered by the interface. It will be appreciated that seating areas of a plurality of geometric shapes may be rendered into an electronic seating chart.

Figure 7E:
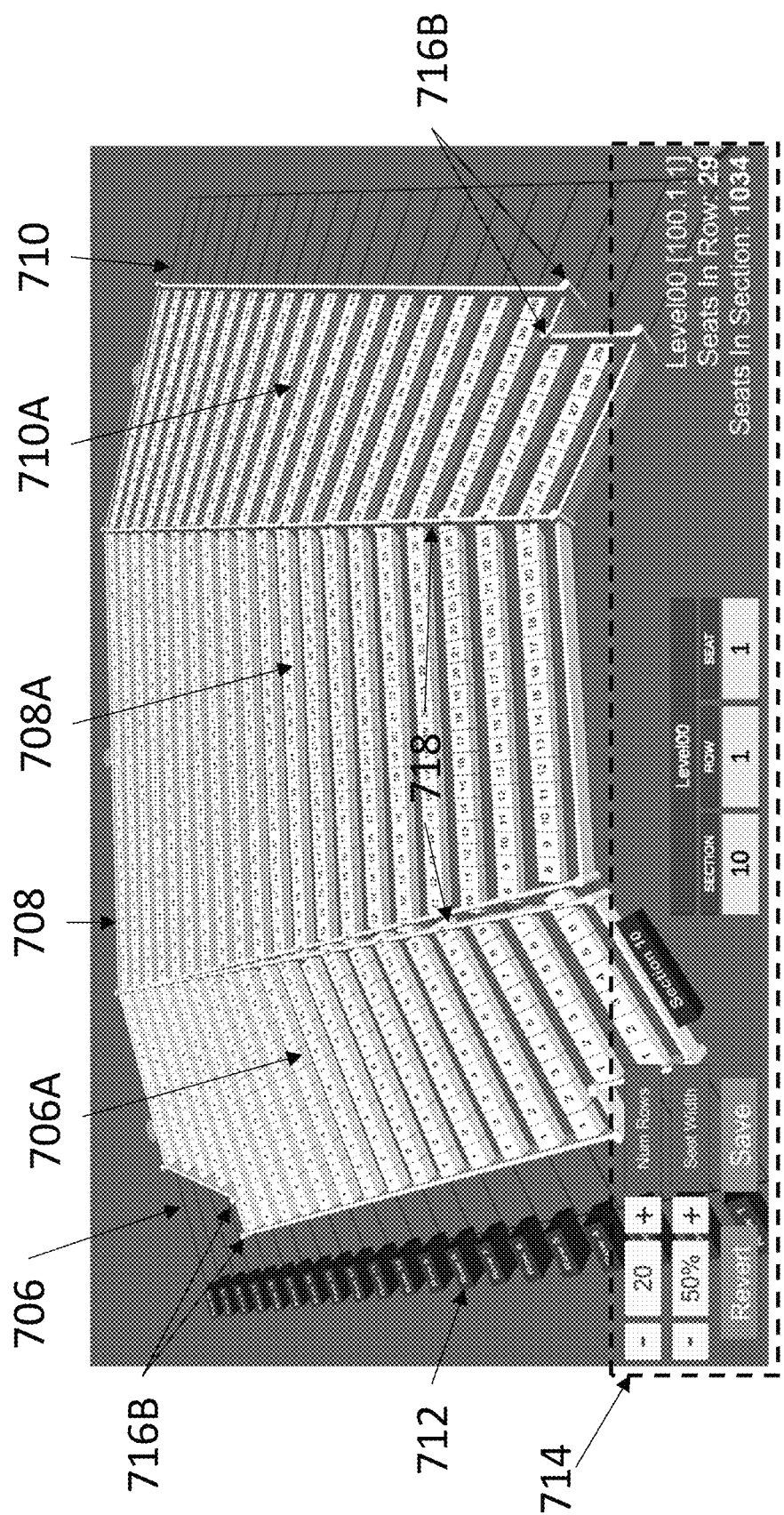

In FIG. 7E, after having received from a requesting computing device one or more user interface interaction signals, and/or additional interaction signals to transform one or more seating areas or features thereof, example embodiments may further provision the generation, or re-generation, of one or more seating areas rendered with seat icons (e.g., cubes, rendered models, etc.) aligned according to the rows of the seating section. In some embodiments, the rendered seat icons associated with a seating area are identical throughout the seating area. The electronic seating chart may comprise seats in each row configured according to one or more of a seating parameter. The seating parameter may be configured to allocate a maximum number of seats to a given row or seating area and automatically configure an empty space, such as a space too small for a another seat, to be evenly distributed between the rendered seat icons of a row and/or seating area. For example, if a row is 54 RDUs long and each seat is 5 RDUs wide then 10 seat icons may be rendered for that particular row with the remaining 4 RDUs of empty space evenly rendered between the 10 seat icons. In some embodiments, a user, via one or more user interface interaction signals received from a requesting computing device, may specify the width of the seat icons to be rendered in RDUs, as shown in FIG. 7E (e.g., seat with is equal to 50% of 1 RDU). In some embodiments, seat icon positions are controlled by one or more control points (e.g., graphical tool elements) and a specified seat icon width. In some embodiments, the interface, for example, graphical elements of selection pane 714 may render statistical information for the electronic seating chart total numbers of seats in each row and each section, for additional to cross check.

Figure 7F:
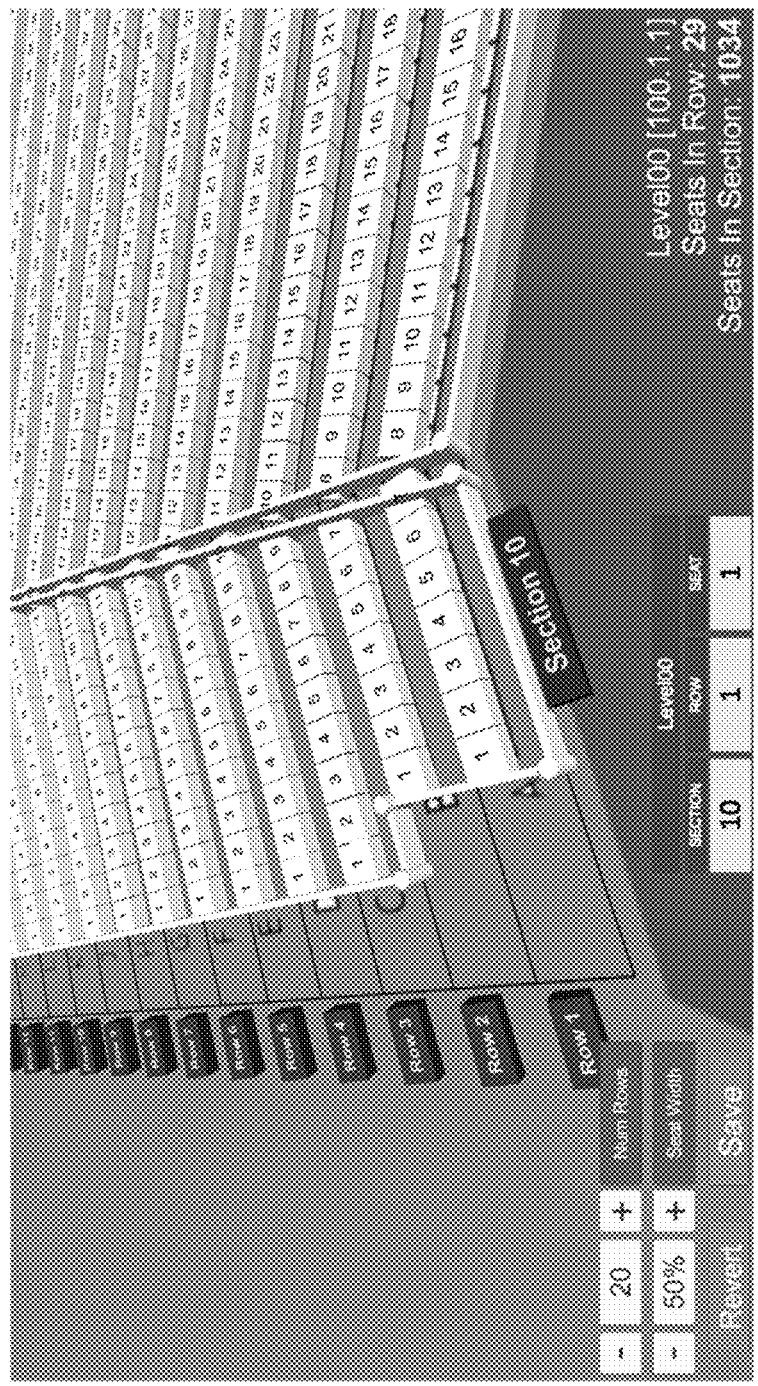

In FIG. 7F, after having received subsequent user interface interaction signals to transform the allocation of seat icons throughout a row and/or seating section. The electronic seating chart may be rendered over the digital image (e.g., exemplary digital image 700 of FIG. 7A). In some embodiments, a user may transmit, via a computing device, additional user interface interaction signals to transform the allocation of seat icons of the electronic seating chart to further align with the digital image initially uploaded. In some embodiments, a user, via user interface interaction signals, may generate an electronic seating chart without initially uploading a digital image and may further upload a digital image at a later time for rendering a visual comparison between the digital image and the electronic seating chart.

Figure 7G:
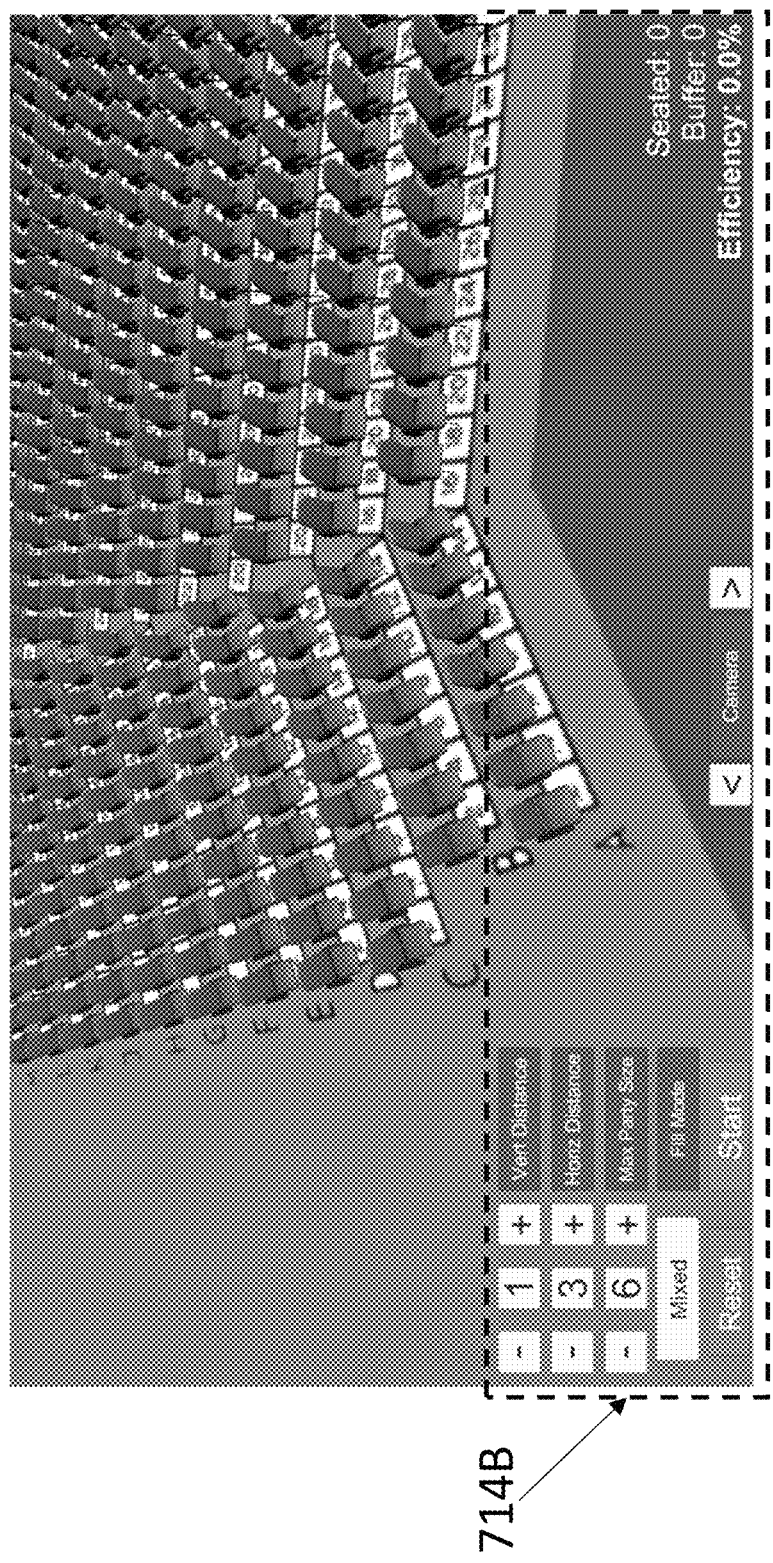

In FIG. 7G, after having received confirmation that the generation and allocation of the plurality of physical units is acceptable (e.g., by way of user interface interaction signals received from a requesting computing device or by internal confirmation by the physical unit allocation system), a plurality of physical units (e.g., three-dimensional model renderings of a particular seating type) may be generated over the previously rendered seat icons (e.g., numbered cubes). In some embodiments, a user, via user interface interaction signals received from a requesting computing device (e.g., via interface selection pane 714B), may cause a selection and deletion of individual seats, for example, to leave holes, or to further mark those seats as special (e.g., remove a standard seating model and add in a luxury seating model, remove seats for wheel chair seating, add wheelchair companion seats, etc.). In some embodiments, the user may further cause the insertion into the electronic seating chart of one or more physical units, for example, aisles, obstructions (e.g., doors, columns, handrails, walls, windows, etc.), and entrances/exits. In some embodiments, the user may further transform individual rows to be wider or more narrow, for example, a handicap accessible row may be twice as wide as a standard row.

In FIG. 7G, a user, via at least user interface interactions received from a computing device, for example, via selection pane 714B, may assign a numbering scheme to one or more seat icons of the electronic seating chart. In some embodiments, assigning a numbering scheme comprises adding, or transforming, one or more seat identifiers. In some embodiments, transformation of a first seat identifier associated with a seat of a plurality of seats will automatically update, based on an internal confirmation by the physical unit allocation system, all subsequent seats of the plurality of seats. For example, if the bottom left most seat in a seating area is associated with a seat identifier of A-1 (e.g., first row, first seat) a user may transform the identifier, via at least user interface interactions received from a computing device, to 1-100 (e.g., first row, first seat) and in response, for example, via internal confirmation by the physical unit allocation system, the subsequent seat identifier may be transformed from A-2 to 1-101 (and the next subsequent identifier from A-3 to 1-102 and so on for all seat identifiers associated with a seat in the selected seating row and/or seating area).

In some embodiments, a user, via at least user interface interactions received from a computing device, may transform a seat identifier individually without adjusting surrounding seat identifiers. For example, a first seat identifier may be transformed in the electronic seating chart from A-1 to 'President' to mark that particular seat as permanently reserved for the President of the organization that operates the physical space (e.g., venue).

Example embodiments track the seat identifiers throughout the venue (e.g., a 150,000 seat stadium) to ensure that each rendered seat icon is assigned a unique seat identifier. In some embodiments, a user, via at least user interface interactions received from a computing device, may, for example, select a seat (e.g., double click an individual seat icon) and the interface may render graphical elements associated with one or more of a price, reservation status, color code, seat type, seat identifier, location relative to a physical unit (e.g., a pathway to the nearest exit), the like, or combinations thereof.

FIG. 8A is another exemplary digital image that may be transmitted to and received by the interface and processed with a series of exemplary operations associated with electronic seating chart generation, for use with embodiments of the present disclosure. The exemplary digital image 800, of FIG. 8A, comprises a plurality of vertically aligned rows, diagonal rows, and curve rows to be reflected via an electronic seating chart. Embodiments of the present disclosure enable provision, via a user interface, of various metrics associated with a physical space, and generation of an interface for rendering a graphical representation of the physical space based on the various metrics. Such a graphical representation may comprise the physical space without any physical units allocated (e.g., an empty seating chart). In alternative embodiments, the graphical representation may be dynamically updated as physical units are generated and allocated such that the physical space representation (e.g., electronic seating chart) reflects some or all of its associated physical units. In some embodiments, a user associated with a computing device may identify and upload, via at least user interface interactions received from the computing device, exemplary digital image 800, by way of graphical elements of the interface, to an electronic seating chart representative of a physical space. It will be appreciated that the uploaded digital image may function as a visual guide in accordance with example embodiments.

In FIG. 8B, the exemplary interface comprises graphical representation of a plurality of physical units (e.g., a seating section, seating area, rows, etc.) as part of a physical space (e.g., a venue). The exemplary interface may further comprise a selection pane 714 whereby selections including physical dimensions (e.g., distances between physical units, seat dimensions, etc.) of the electronic seating chart may be provided, as well as physical unit quantities (e.g., a number of rows, seats, seating sections, seating areas, etc.) and a physical unit arrangement type (e.g., straight, curved, etc.). In some embodiments, physical dimensions may be entered by a user via a computing device into the interface as a discrete number (e.g., 10 meters, 3 inches, etc.) or a relative value (e.g., 30% of a single seat width, height, or depth, etc.).

In FIG. 8B, the exemplary interface may further comprise graphical tool elements (e.g., graphical tool elements 802, 804, 816) within the virtual physical space associated with one or more generated physical units (e.g., a seating section, etc.). The graphical tool elements 802 may be configured to receive user interface interactions received from a computing device and in response to the received interactions the electronic seating chart will be configured, such as by a processor, with an additional seating section. For example, a user may click, with a mouse cursor, graphical tool elements 802 and a seating section may be added to the electronic seating chart to the right of the rendered seating section. In some embodiments, the generated seating section may be configured, such as by a processor, to share one or more joints or corners with the rendered seating section. The graphical tool elements 804 may be configured, such as by a processor, to receive user interface interactions received from a computing device and in response to the received interactions a rendered seating section will be deleted from the electronic seating chart.

FIG. 8B, the exemplary interface may further comprise graphical tool element 816. The graphical tool element 816 may be configured to receive one or more user interface interactions received from a computing device and in response to the received interactions the curvature of a seating section associated with graphical tool element 816 may be increased or decreased. For example, a user, via at least the input circuitry of a computing device, may, click and drag with a mouse cursor graphical tool element 816 and in proportion to the translation of graphical tool element 816 by the mouse cursor the curvature of the corresponding seating section will increase. In some embodiments, graphical tool element 816 may comprise a slider bar, a plurality of graphical tool elements, the like, or combinations thereof.

In FIG. 8C, after having received a user interface interaction comprising, for example, at least a click and drag motion with the mouse cursor, graphical tool element 816 may translate upwards away from the seating section. In response, to the user interface interaction signals received from a requesting computing device by graphical tool element 816, the seating section and rows thereof, by internal confirmation of the interface signals by the physical unit allocation system, may transform (e.g., arc, bend, curve, etc.) proportionally toward a translation direction (e.g., a vector) followed by graphical tool element 816. In some embodiments, where graphical tool element 816 comprises a plurality of graphical tool elements the seating sections may transform from a linear row configuration to a spline shape (e.g., a plurality of arcs, bends, curves, etc.).

In FIG. 8D, after having received confirmation that the interactions signals applied to graphical tool element 816 of the electronic seating chart interface have ceased (e.g., by way of user interface interaction signals received from a requesting computing device or by internal confirmation by the physical unit allocation system), a plurality of seat icons are generated and rendered (e.g., as three-dimensional seat models). As illustrated by FIG. 8D the generated rows in the seating area of the electronic seating chart are rendered via the graphical user interface, for display on a computer device, with a continuous curvature throughout each row. In some embodiments, the curvature applied to a row may automatically cause, such as by a processor, a generation of additional seats within said row based on an increased row length. It will be appreciated that the addition of a curvature to a row will increase the length of the row. In some embodiments, the curvature of a row may be represented by Cartesian coordinates, polar coordinates, cylindrical coordinates, the like, or combinations thereof.

In embodiments, curved sections (e.g., seating sections, seating areas, walk ways, aisles, etc.) may be approximated by a connected sequence of shorter straight segments where the vertices of the straight segments lie on the arc of the original curve, including the endpoints of the curve. Such segments will be dynamically generated by a process that uniformly subdivides the curve into a finite number of straight segments such that the deviation in distance or in curvature between the straight segments and the original curve does not exceed a given tolerance (e.g., 2 degrees, etc.). This can be done through direct computation or through an adaptive process that interactively subdivides straight segments into smaller segments until the errors are within the tolerance.

In embodiments, the straight line segments are of equal length and are evenly distributed alone the length of a curved line of the curved section. In embodiments, the plurality of straight lines may define one or more of a spline, curve, semi-circle, or the like. In embodiments, a graphical tool element is associated with the end of each line segment and can receive an interaction signal (e.g., mouse clicks, mouse drags, etc.) to increase or decrease an angle between a first line segment and a second line segment or to re-position the first and/or second line segments. In embodiments, in response to re-positioning one or more line segments one or more additional line segments may be dynamically generated to accommodate the new position and maintain the continuity of the curved line associated with the plurality of straight line segments.

FIGS. 9A and 9B illustrate exemplary operations associated with automatic generation of physical units of a physical space into an electronic seating chart, for use with embodiments of the present disclosure. In embodiments, the exemplary operations 900 illustrated in FIGS. 9A and 9B may be performed using one or more physical unit allocation servers 104 as discussed above.

In embodiments, a digital image is received 902 from a first computing device (e.g., 101A-101N). The digital image may comprise one or more of a seating chart, photograph of a physical space, or digital document. The digital document may comprise one or more of a color code, price chart, or referential data structure.

In response to receipt of the digital image, an interface is transmitted 904 to the first computing device (e.g., 101A-101N). In embodiments, the interface is configured to at least render the digital image. The interface may comprise graphical elements configured for interaction with a user via computing device to generate and/or transform an electronic seating chart.

In embodiments, a physical space allocation input is received 906 from a first computing device (e.g., 101A-101N). In some embodiments, a plurality of physical space allocation inputs are received from one or more computing devices (e.g., 101A-101N). The one or more physical space allocation input signals are entered by one or more users, associated with a respective computing device (e.g., 101A-101N), and one or more physical unit interface elements overlaid atop the digital image. In some embodiments, the one or more physical space allocation inputs may comprise one or more of a transformation, deletion, or addition of a physical unit. In some embodiments, the one or more physical space allocation inputs are automatically determined based on information received from at least the digital image.

In embodiments, a first modified interface is transmitted 908 to the first computing device (e.g., 101A-101N). The first modified interface may be configured for rendering a seating section interface element based on the physical unit interface elements overlaid atop the digital image.

In embodiments, a seating parameter is received 910 from the first computing device (e.g., 101A-101N). In some embodiments, the seating parameter may comprise one or more of a row quantity, a row depth, a seat width, a joint angle, or a rise height. The seating parameter further defines the characteristics of one or more seating section interface elements, and based on the seating parameters the interface, via one or more seating section interface elements, is transformed to reflect the seating parameters.

In embodiments, a second modified interface is transmitted 912 in response to the received seating parameter to the first computing device (e.g., 101A-101N). The second modified interface may be configured for rendering a three-dimensional model of a physical space represented by the digital image, wherein the second modified interface comprises one or more seating area interface sub-elements within the seating section interface element. In some embodiments, the seating area interface sub-element is generated as part of a seating section interface element. The seating area interface sub-element may comprise a plurality of volumetric cells that are graphical representations of at least a plurality of seats being distributed within the seating area interface sub-element according to the seating parameter. In some embodiments, the plurality of seats is a maximum number of seats that can be automatically distributed, such as by a processor, within the seating area interface sub-element based on at least one or more seat dimensions (e.g., width of a single seat). The one or more seat dimensions may vary based on a seating type (e.g., bench seat, luxury seat, etc.). In some embodiments, any remaining space within a seating area interface sub-element, or row of a seating area interface sub-element, that cannot be filled by a volumetric cell may be automatically evenly distributed, such as by a processor, between the plurality of volumetric cells.

In embodiments, a physical allocation data structure is generated 914 based at least in part on an approval signal received from the first computing device. The physical allocation data structure may be based on the three-dimensional model of the physical space represented by the digital image. In embodiments, a seating manifest may be generated based on the physical allocation data structure for output (e.g., retrieval by, transmission to, storage in, etc.) to one or more computing devices.

FIGS. 10A, 10B, and 10C illustrate multiple views of an exemplary electronic seating chart 1000, for use with embodiments of the present disclosure. Exemplary electronic seating chart 1000 may be generated or transformed in conjunction with one or more embodiments of the present disclosure (e.g., exemplary operations 900, or the like). Electronic seating chart 1000, as illustrated in FIGS. 10A-C, includes seating section pane 1002 and selection pane 1004 each comprising a plurality of interactive graphical interface elements for receipt of interaction signals via a computing device interface (e.g., a keyboard, mouse, etc.). FIGS. 10B-C depict a plurality of rows 1006 positioned, within a seating area 1008, in accordance with seating parameters of a physical space (e.g., a venue). In embodiments, the plurality of rows 1006, and the seating icons therein, are positioned, at least partially, in accordance with seating parameters retrieved from a seating manifest file.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An apparatus comprising one or more processors and at least one memory, the at least one memory storing instructions that, when executed by the one or more processors, cause the apparatus to:
   receive, from a first computing device, a digital image;
   transmit, to the first computing device, an interface configured for rendering the digital image via a display device of the first computing device;
   receive, from the first computing device and based on first interactions by the first computing device with the interface, a user-directed physical space allocation input, the user-directed physical space allocation input defining one or more physical unit interface elements overlaid atop the digital image and defining boundaries of one or more seating areas;
   transmit, to the first computing device, a first modified interface configured for rendering a seating section interface element, the seating section interface element comprising one or more seating area interface sub-elements associated with the one or more seating areas, and the rendering of the seating section interface element based on the one or more physical unit interface elements overlaid atop the digital image;
   receive, from the first computing device and based on second interactions by the first computing device with the first modified interface, a seating area dimension and a seat dimension;
   generate, based on the seating area dimension and the seat dimension, a plurality of seats associated with the one or more seating area interface sub-elements;
   transmit, to the first computing device, a second modified interface configured for rendering a three-dimensional model of a physical space represented by the digital image, wherein the second modified interface comprises the seating section interface element and a plurality of graphical representations of the plurality of seats associated with the one or more seating area interface sub-elements;
   receive, from the first computing device and based on third interactions by the first computing device with the second modified interface, a user-directed modification of the seating section interface element;
   responsive to receiving the user-directed modification of the seating section interface element, regenerate the plurality of seats associated with the one or more seating area interface sub-elements based on the user-directed modification of the seating section interface element; and
   further responsive to receiving the user-directed modification of the seating section interface element, transmit, to the first computing device, a third modified interface configured for rending the three-dimensional model of the physical space represented by the digital image, and a plurality of graphical representations of the plurality of regenerated seats associated with the one or more seating area interface sub-elements.

2. The apparatus of claim 1, wherein the user-directed modification of the seating section interface element comprises at least one of translating, expanding, or contracting the seating section interface element.

3. The apparatus of claim 1, wherein the at least one memory further stores instructions that, when executed by the one or more processors, cause the apparatus to:
   generate, based on an approval signal received from the first computing device, a physical allocation data structure based on the three-dimensional model of the physical space represented by the digital image, wherein the physical allocation data structure is configured for use with an integrated ticketing system.

4. The apparatus of claim 3, wherein the at least one memory further stores instructions that, when executed by the one or more processors, cause the apparatus to:
   transmit, to the first computing device, the physical allocation data structure;
   receive, from the first computing device, color-coded definitions, wherein the color-coded definitions associate one or more of a color or an infill pattern of the digital image with one or more of a seat, a location within the physical space, or a price; and
   generate, based on at least the color-coded definitions, one or more of a second seating area interface sub-element or a pricing list associated with the physical allocation data structure.

5. The apparatus of claim 1, wherein the at least one memory further stores instructions that, when executed by the one or more processors, cause the apparatus to:
   receive, from the first computing device and based on the second interactions by the first computing device with the third modified interface, one or more of a row quantity, a row depth, a seat width, a joint angle, or a rise height.

6. The apparatus of claim 1, wherein the at least one memory further stores instructions that, when executed by the one or more processors, cause the apparatus to:
   receive, from the first computing device and based on fourth interactions by the first computing device with at least one of the second modified interface, or the third modified interface, a seating area interaction comprising one or more of an addition interaction, a location interaction, or a deletion interaction; and transform, based on the seating area interaction, the one or more seating area interface sub-elements.

7. The apparatus of claim 1, wherein the at least one memory further stores instructions that, when executed by the one or more processors, cause the apparatus to:
automatically distribute an identified space between a plurality of seats in a row of seats.

8. The apparatus of claim 1, wherein the at least one memory further stores instructions that, when executed by the one or more processors, cause the apparatus to:
receive, from the first computing device, a deletion interaction with at least one of the second modified interface, or the third modified interface;
responsive to receiving the deletion interaction, regenerate the plurality of seats associated with the one or more seating area interface sub-elements based on the deletion interaction; and
further responsive to receiving the deletion interaction, transmit, to the first computing device, a fourth modified interface configured for rending the three-dimensional model of the physical space represented by the digital image, and a plurality of graphical representations of the plurality of regenerated seats associated with the one or more seating area interface sub-elements.

9. The apparatus of claim 1, wherein the at least one memory further stores instructions that, when executed by the one or more processors, cause the apparatus to:
receive, from the first computing device and based on the second interactions by the first computing device with the first modified interface, a relative unit of scale comprising a row depth unit (RDU) with which the plurality of seats are rendered to scale.

10. The apparatus of claim 1, wherein each seat comprises a number based on a numbering scheme.

11. The apparatus of claim 1, wherein the digital image comprises overlapping levels.

12. The apparatus of claim 1, wherein the digital image comprise a photograph of the physical space.

13. The apparatus of claim 1, wherein the one or more seating area interface sub-elements comprise a physical feature, the physical feature comprising a seat, aisle, wall, rail, balcony, structural support, stairs, restrooms, parking, concessions, or doorway.

14. A non-transitory computer readable storage medium comprising instructions, that when executed by one or more processors, cause an apparatus to:
receive, from a first computing device, a digital image;
transmit, to the first computing device, an interface configured for rendering the digital image via a display device of the first computing device;
receive, from the first computing device and based on first interactions by the first computing device with the interface, a user-directed physical space allocation input, the user-directed physical space allocation input defining one or more physical unit interface elements overlaid atop the digital image and defining boundaries of one or more seating areas;
transmit, to the first computing device, a first modified interface configured for rendering a seating section interface element, the seating section interface element comprising one or more seating area interface sub-elements associated with the one or more seating areas, and the rendering of the seating section interface element based on the one or more physical unit interface elements overlaid atop the digital image;
receive, from the first computing device and based on second interactions by the first computing device with the first modified interface, a seating area dimension and a seat dimension;
generate, based on the seating area dimension and the seat dimension, a plurality of seats associated with the one or more seating area interface sub-elements;
transmit, to the first computing device, a second modified interface configured for rendering a three-dimensional model of a physical space represented by the digital image, wherein the second modified interface comprises the seating section interface element and a plurality of graphical representations of the plurality of seats associated with the one or more seating area interface sub-elements;
receive, from the first computing device and based on third interactions by the first computing device with the second modified interface, a user-directed modification of the seating section interface element;
responsive to receiving the user-directed modification of the seating section interface element, regenerate the plurality of seats associated with the one or more seating area interface sub-elements based on the user-directed modification of the seating section interface element; and
further responsive to receiving the user-directed modification of the seating section interface element, transmit, to the first computing device, a third modified interface configured for rending the three-dimensional model of the physical space represented by the digital image, and a plurality of graphical representations of the plurality of regenerated seats associated with the one or more seating area interface sub-elements.

15. The non-transitory computer readable storage medium of claim 14, wherein the user-directed modification of the seating section interface element comprises at least one of translating, expanding, or contracting the seating section interface element.

16. The non-transitory computer readable storage medium of claim 14, wherein the non-transitory computer readable storage medium further comprise instructions, that when executed by one or more processors, cause the apparatus to:
generate, based on an approval signal received from the first computing device, a physical allocation data structure based on the three-dimensional model of the physical space represented by the digital image, wherein the physical allocation data structure is configured for use with an integrated ticketing system.

17. The non-transitory computer readable storage medium of claim 16, wherein the non-transitory computer readable storage medium further comprise instructions, that when executed by one or more processors, cause the apparatus to:
transmit, to the first computing device, the physical allocation data structure;
receive, from the first computing device, color-coded definitions, wherein the color-coded definitions associate one or more of a color or an infill pattern of the digital image with one or more of a seat, a location within the physical space, or a price; and
generate, based on at least the color-coded definitions, one or more of a second seating area interface sub-element or a pricing list associated with the physical allocation data structure.

18. The non-transitory computer readable storage medium of claim 14, wherein the non-transitory computer readable storage medium further comprise instructions, that when executed by one or more processors, cause the apparatus to:

receive, from the first computing device and based on the second interactions by the first computing device with the third modified interface, one or more of a row quantity, a row depth, a seat width, a joint angle, or a rise height.

19. The non-transitory computer readable storage medium of claim 14, wherein the non-transitory computer readable storage medium further comprise instructions, that when executed by one or more processors, cause the apparatus to:

receive, from the first computing device and based on fourth interactions by the first computing device with at least one of the second modified interface, or the third modified interface, a seating area interaction comprising one or more of an addition interaction, a location interaction, or a deletion interaction; and transform, based on the seating area interaction, the one or more seating area interface sub-elements.

20. A computer-implemented method comprising:

receiving, from a first computing device, a digital image;

transmitting, to the first computing device, an interface configured for rendering the digital image via a display device of the first computing device;

receiving, from the first computing device and based on first interactions by the first computing device with the interface, a user-directed physical space allocation input, the user-directed physical space allocation input defining one or more physical unit interface elements overlaid atop the digital image and defining boundaries of one or more seating areas;

transmitting, to the first computing device, a first modified interface configured for rendering a seating section interface element, the seating section interface element comprising one or more seating area interface sub-elements associated with the one or more seating areas, and the rendering of the seating section interface element based on the one or more physical unit interface elements overlaid atop the digital image;

receiving, from the first computing device and based on second interactions by the first computing device with the first modified interface, a seating area dimension and a seat dimension;

generating, based on the seating area dimension and the seat dimension, a plurality of seats associated with the one or more seating area interface sub-elements;

transmitting, to the first computing device, a second modified interface configured for rendering a three-dimensional model of a physical space represented by the digital image, wherein the second modified interface comprises the seating section interface element and a plurality of graphical representations of the plurality of seats associated with the one or more seating area interface sub-elements;

receiving, from the first computing device and based on third interactions by the first computing device with the second modified interface, a user-directed modification of the seating section interface element;

responsive to receiving the user-directed modification of the seating section interface element, regenerating the plurality of seats associated with the one or more seating area interface sub-elements based on the user-directed modification of the seating section interface element; and further responsive to receiving the user-directed modification of the seating section interface element, transmitting, to the first computing device, a third modified interface configured for rending the three-dimensional model of the physical space represented by the digital image, and a plurality of graphical representations of the plurality of regenerated seats associated with the one or more seating area interface sub-elements.

\* \* \* \* \*